(12) United States Patent
Druetto et al.

(10) Patent No.: US 12,716,850 B2
(45) Date of Patent: Aug. 25, 2026

(54) OPTICAL-COMPUTING DEVICE AND METHOD FOR ANALYSING LIGHT PASSING THROUGH A CONTAINER MADE OF TRANSPARENT OR TRANSLUCENT MATERIAL BY MEANS OF A DIGITAL POLARIMETRIC CAMERA

(71) Applicant: TIAMA, St. Genis-Laval (FR)

(72) Inventors: Raphael Druetto, Oullins (FR); Marc Leconte, Loire sur Rhone (FR); Yann Pensec, Chaponost (FR)

(73) Assignee: TIAMA, St. Genis-Laval (FR)

( * ) Notice: Subject to any disclaimer, the term of this patent is extended or adjusted under 35 U.S.C. 154(b) by 115 days.

(21) Appl. No.: 18/699,202

(22) PCT Filed: Oct. 6, 2022

(86) PCT No.: PCT/FR2022/051893
§ 371 (c)(1),
(2) Date: Apr. 5, 2024

(87) PCT Pub. No.: WO2023/057726
PCT Pub. Date: Apr. 13, 2023

(65) Prior Publication Data

US 2024/0404035 A1 Dec. 5, 2024

(30) Foreign Application Priority Data

Oct. 8, 2021 (FR) ...................................... 2110694

(51) Int. Cl.
*G01N 21/90* (2006.01)
*G01N 21/21* (2006.01)
(Continued)

(52) U.S. Cl.
CPC ............. *G01N 21/90* (2013.01); *G01N 21/21* (2013.01); *G01N 21/958* (2013.01); *G06T 7/0004* (2013.01); *G06T 2207/30108* (2013.01)

(58) Field of Classification Search
CPC .... G01N 21/21; G01N 21/90; G01N 21/9009; G01N 21/9018; G01N 21/9027;
(Continued)

(56) References Cited

U.S. PATENT DOCUMENTS 7,714,998 B2 * 5/2010 Furman ................. G01N 21/21 356/237.5
8,238,026 B1 * 8/2012 Kemme ................. G01N 21/21 359/489.17
(Continued)

FOREIGN PATENT DOCUMENTS

CN 110832843 A * 2/2020 ............. H04N 5/265
DE 102019205654 A1 10/2020
(Continued)

OTHER PUBLICATIONS

International Search Report issued in PCT/FR2022/051893 dated Mar. 17, 2023 (8 pages).

*Primary Examiner* — Gordon J Stock, Jr.
(74) *Attorney, Agent, or Firm* — ROTHWELL, FIGG, ERNST & MANBECK, P.C.

(57) ABSTRACT

The invention relates to an optical-computing device and method for analysing a container made of transparent or translucent material by means of a polarimetric camera, including: —acquiring at least one master digital image of the container using the photoelectric sensor of the polarimetric camera; —computing an intensity image in which the value of each intensity pixel is an averaged value of the value of at least two pixels of the master digital image corresponding to two circular analyses in opposite directions to one another, or two linear analyses of orthogonal polari-
(Continued)

sation axes or two orthogonal elliptical analyses; —computing at least one phase-shift image by calculating, for a series of composite pixels, a phase-shift pixel from the value of a set of one or more partial pixel(s) belonging to a combination of one or more partial images.

18 Claims, 7 Drawing Sheets

(51) Int. Cl.
*G01N 21/958* (2006.01)
*G06T 7/00* (2017.01)

(58) Field of Classification Search
CPC ........... G01N 21/9036; G01N 21/9045; G01N 21/9054; G01N 21/9072; G01N 21/9081; G01N 21/909; G01N 21/94; G01N 21/958; G01N 21/8803; G01N 21/88; G01N 21/8806; G01N 21/8851; G01N 2021/216; G01N 2021/9063; G01N 2021/945; G01N 2021/8809; G01N 2021/8812; G01N 2021/8816; G01N 2021/8819; G01N 2021/8822; G01N 2021/8829; G01N 2021/8832; G01N 2021/8835; G01N 2021/8838; G01N 2021/8841; G01N 2021/8845; G01N 2021/8848; G01N 2021/8854; G01N 2021/8858; G01N 2021/8861; G01N 2021/8864; G01N 2021/8867; G01N 2021/887; G01N 2021/8874; G01N 2021/8877; G01N 2021/888; G01N 2021/8883; G01N 2021/8887; G01N 2021/889; G01N 2021/8893; G01N 2021/8896; G06T 7/0002; G06T 7/0004; G06T 7/0006; G06T 7/0008; G06T 7/001; G06T 2207/30108; G06T 2207/30204; G01B 11/16; G01B 11/168; G01B 21/32
See application file for complete search history.

(56) References Cited

U.S. PATENT DOCUMENTS

| | | | | |
|---|---|---|---|---|
| 8,786,755 | B2 * | 7/2014 | Awatsuji | H04N 23/56 348/335 |
| 9,551,671 | B2 * | 1/2017 | Colle | G01N 21/958 |
| 10,935,501 | B2 * | 3/2021 | Smith | G01N 21/8806 |
| 11,415,791 | B1 * | 8/2022 | Park | H04N 23/90 |
| 2022/0236193 | A1 | 7/2022 | Niedermeier | |
| 2024/0019358 | A1 * | 1/2024 | Fan | G02B 27/286 |
| 2024/0385123 | A1 * | 11/2024 | Colle | G01M 5/0091 |
| 2025/0008228 | A1 * | 1/2025 | Komatsu | G06T 5/20 |
| 2025/0067660 | A1 * | 2/2025 | Carey | G01N 21/8806 |

FOREIGN PATENT DOCUMENTS

| | | | | | |
|---|---|---|---|---|---|
| DE | 102019208296 | A1 | | 12/2020 | |
| EP | 2275790 | A2 | | 1/2011 | |
| FR | 3056297 | A1 | * | 3/2018 | G01N 21/958 |
| JP | 2003215057 | A | * | 7/2003 | G01N 21/9027 |
| KR | 20130005244 | A | * | 1/2013 | G01J 3/0264 |
| WO | WO-9746329 | A1 | * | 12/1997 | B07C 5/365 |
| WO | 2020/212014 | A1 | | 10/2020 | |
| WO | WO-2023115990 | A1 | * | 6/2023 | H10F 39/18 |
| WO | WO-2023171058 | A1 | * | 9/2023 | G01N 21/21 |
| WO | WO-2024018163 | A1 | * | 1/2024 | G01N 21/90 |
| WO | WO-2024141740 | A1 | * | 7/2024 | G01N 21/8806 |

* cited by examiner

[Fig. 1]
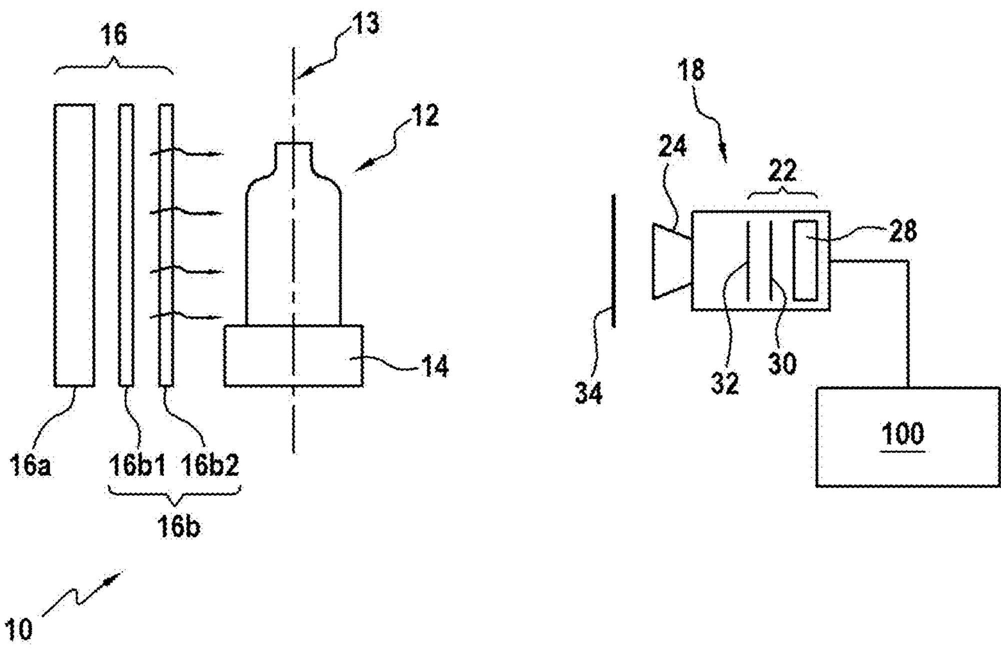
[Fig. 2]
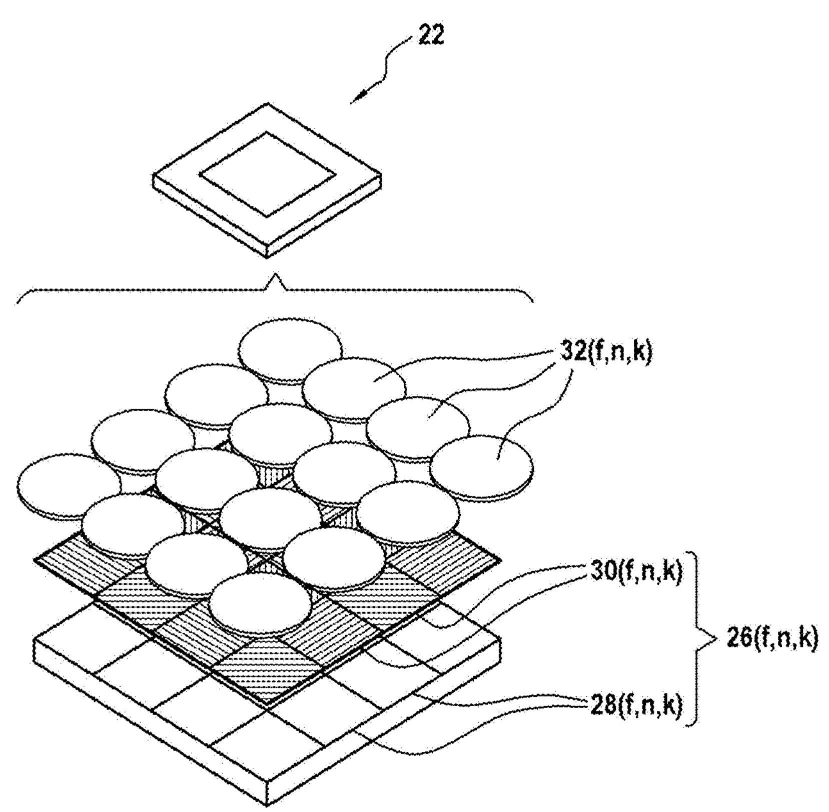

[Fig. 3]
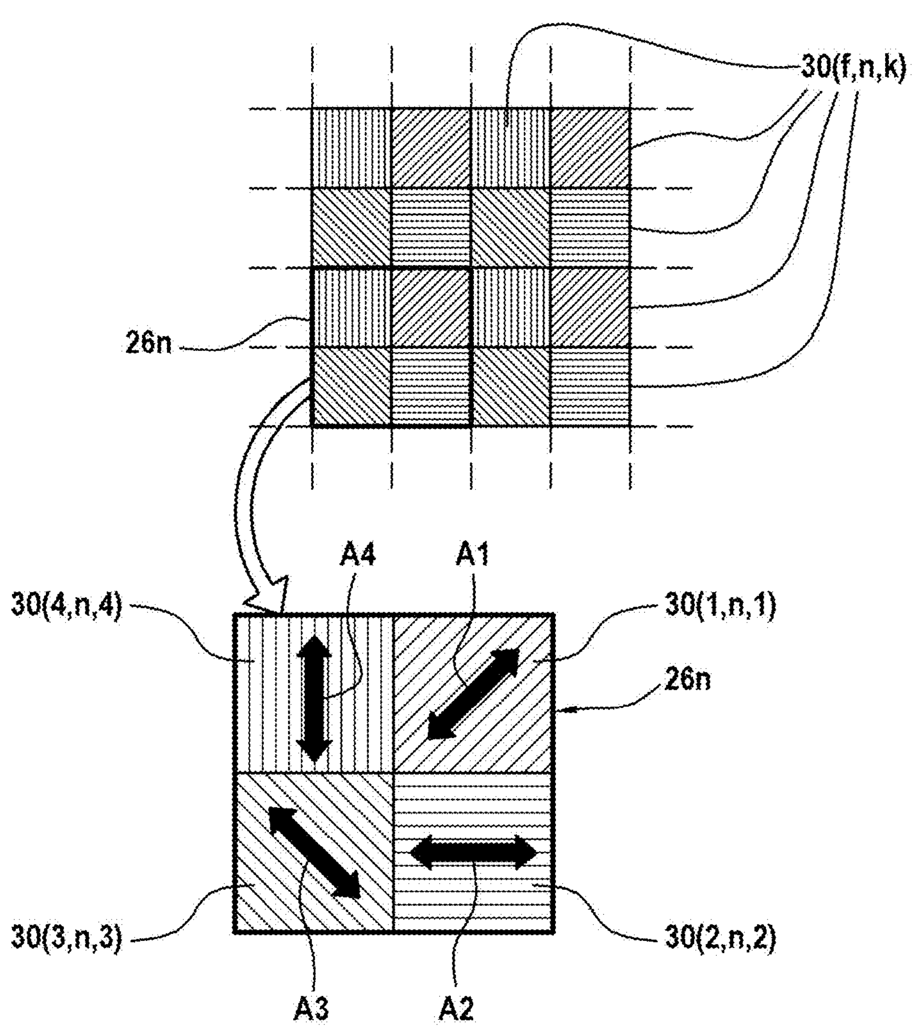

[Fig. 4]
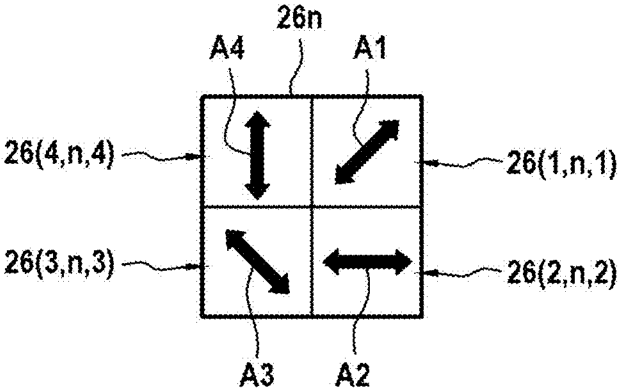
[Fig. 5]
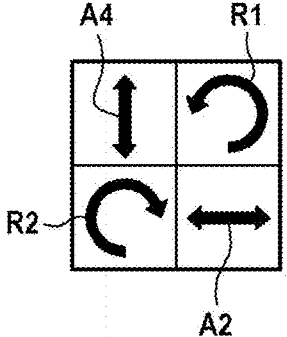
[Fig. 6]
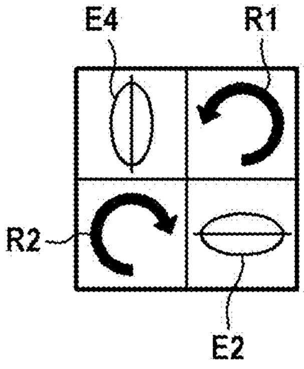

[Fig. 7]
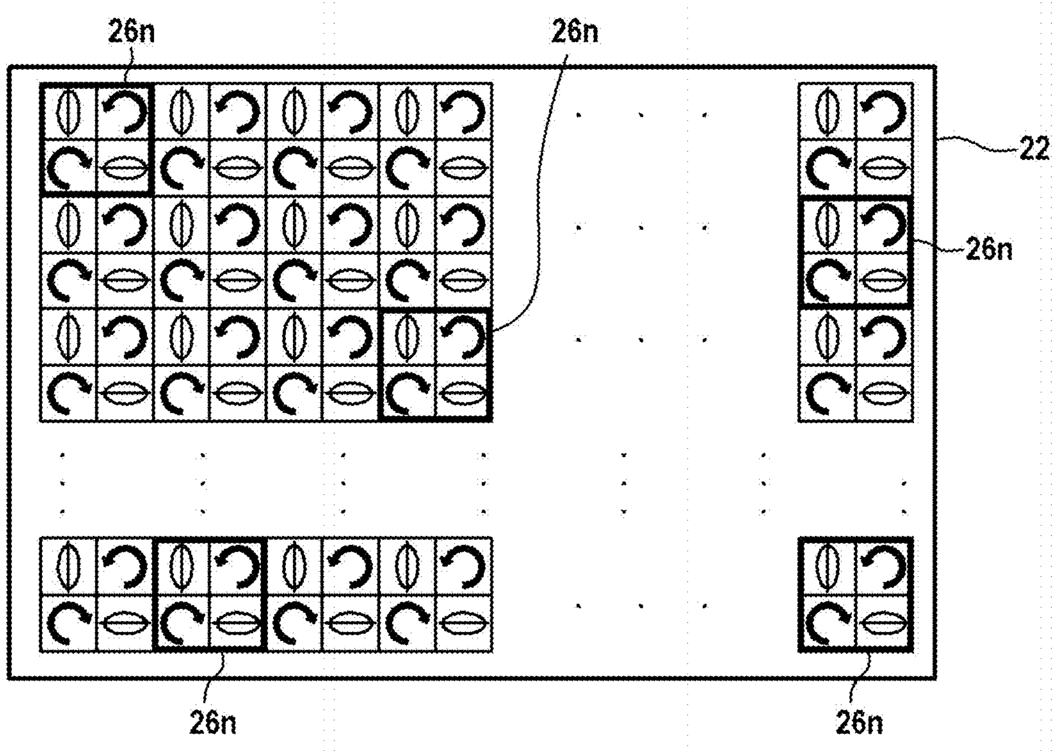
[Fig. 8]
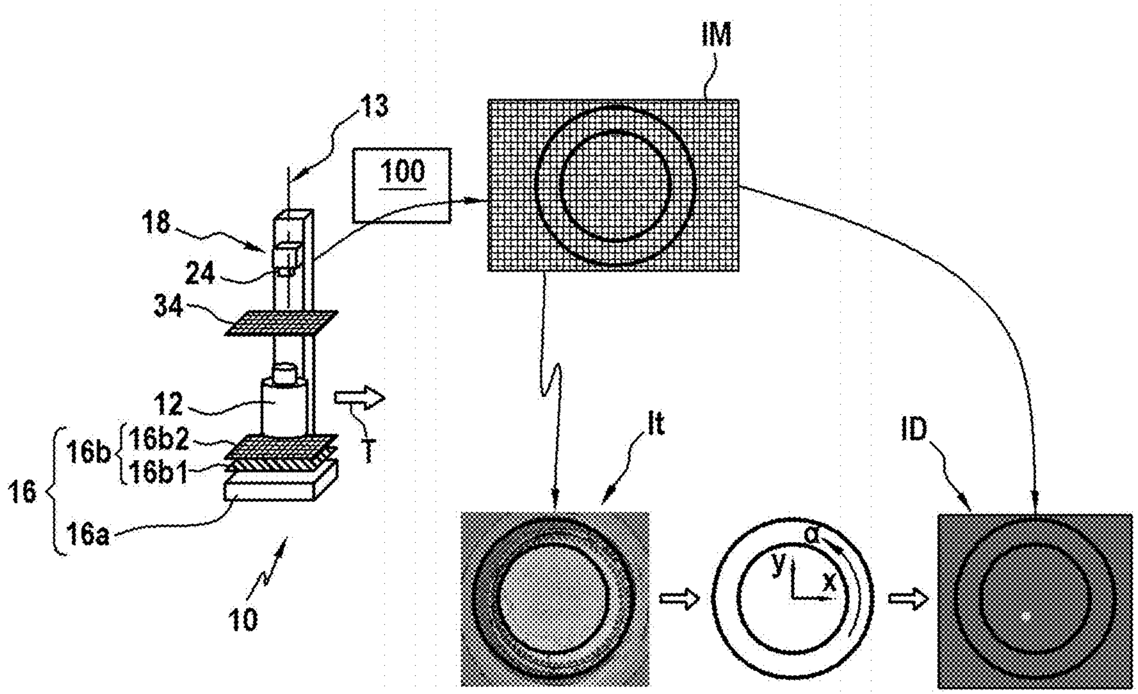

[Fig. 9]
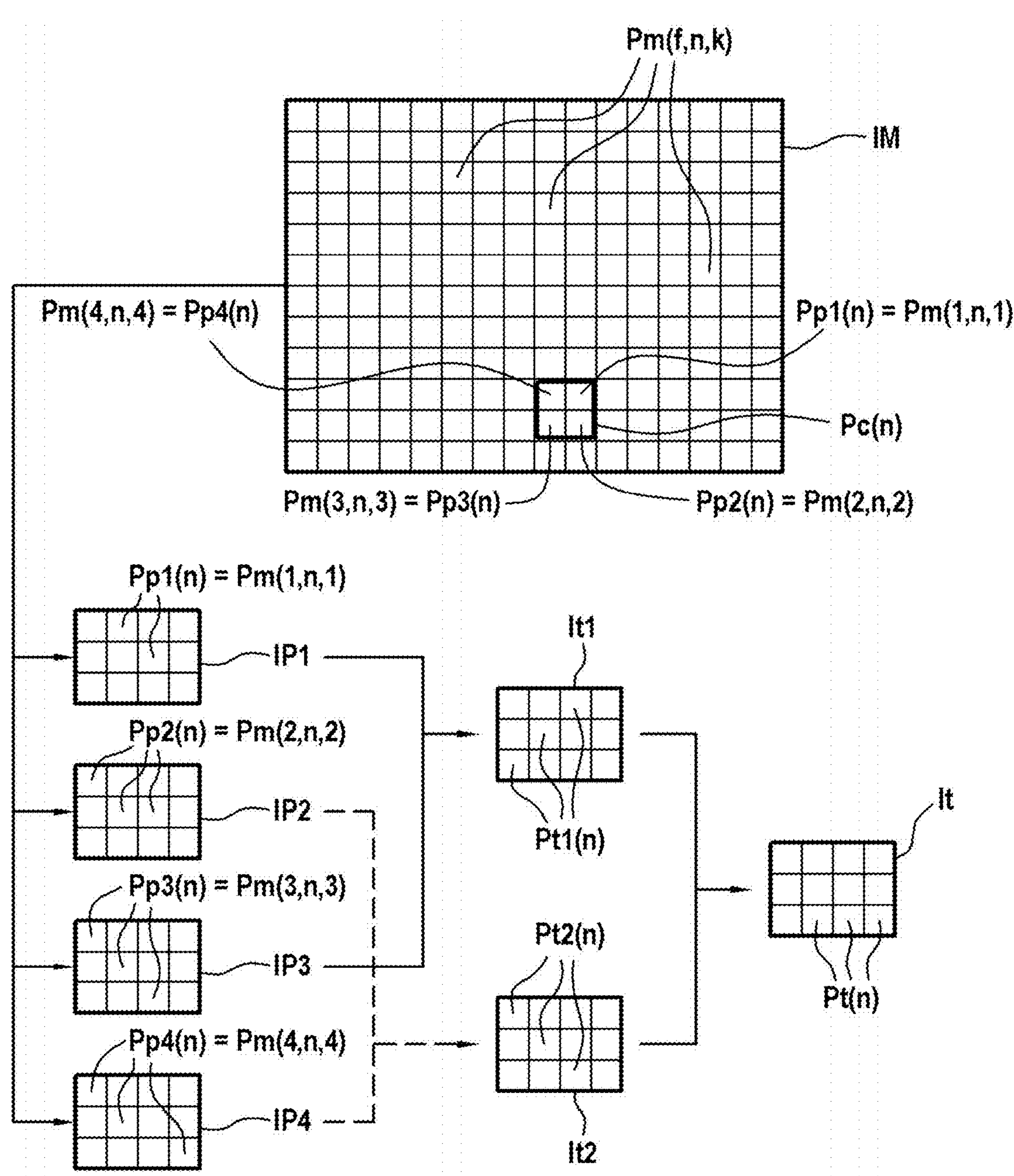

[Fig. 10]
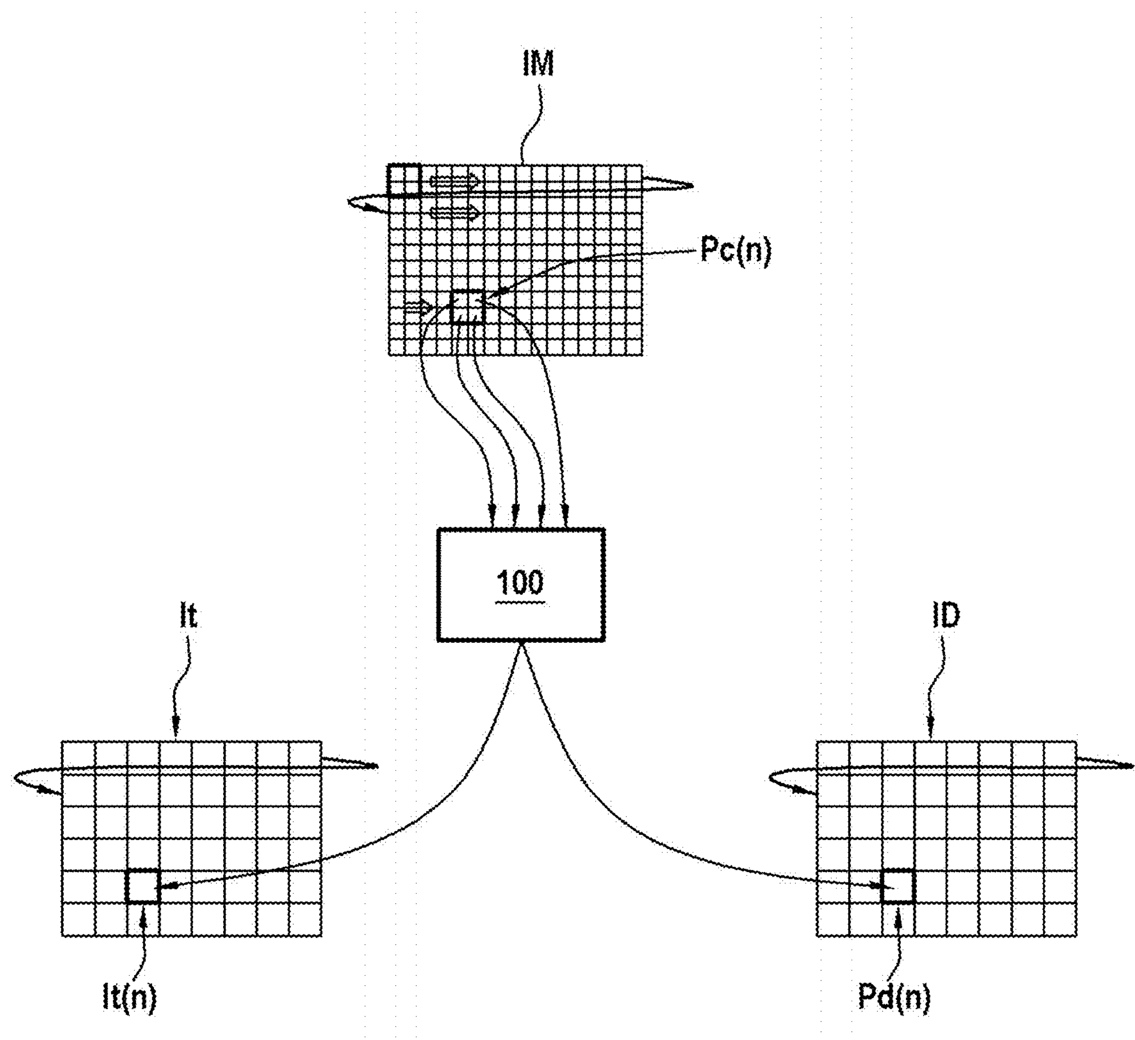
[Fig. 11]
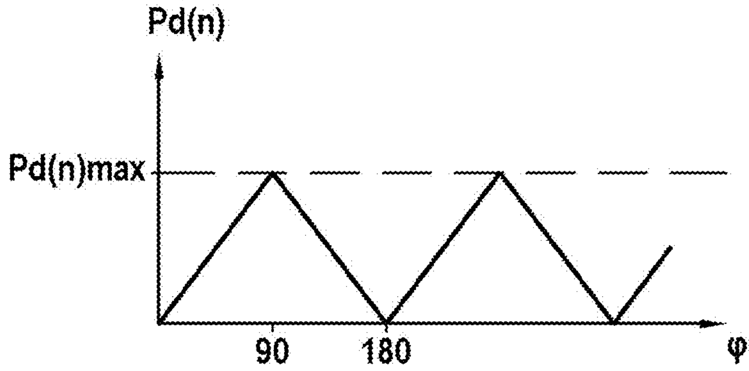

[Fig. 12]
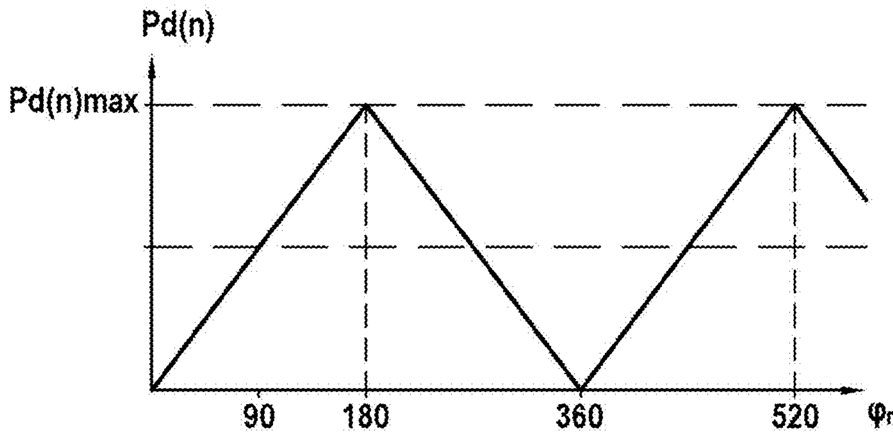

OPTICAL-COMPUTING DEVICE AND METHOD FOR ANALYSING LIGHT PASSING THROUGH A CONTAINER MADE OF TRANSPARENT OR TRANSLUCENT MATERIAL BY MEANS OF A DIGITAL POLARIMETRIC CAMERA

CROSS REFERENCE TO RELATED APPLICATIONS

This application is a 35 U.S.C. § 371 National Phase Entry Application from PCT/FR2022/051893, filed Oct. 6, 2022, designating the United States, claiming the benefit of FR Application No. 2110694, filed Oct. 8, 2021, the disclosures of which are incorporated herein by reference in their entirety.

TECHNICAL FIELD

The invention relates to an optical-computing method for the analysis via transmitted light, of a glass container by means of a digital polarimetric camera, leading in particular to a computerized detection of defects, if any, in the material of the container, namely a transparent or translucent material, in order to be able to identify whether or not such defects are unacceptable.

Throughout the description, transparent or translucent material refers to white glass, in particular white or colored glass, or plastics or polymers of any origin, e.g. polyethylene phteralate (PET) or high-density polyethylene (HDPE).

BACKGROUND

There are a large number of optical-computing methods for analyzing a glass container in order to detect defects therein, using one or a plurality of digital cameras, wherein the detection and, if appropriate, identification or classification of defects is carried out by computer analysis of one or a plurality of digital images acquired by the cameras. Certain methods acquire a digital image via light reflected on the container. Other methods, such as the methods contemplated in the invention, work via transmitted light, the light source being in such case in the field of view of the digital camera used. In the most conventional methods, any defects are detected in one or a plurality of digital intensity images acquired by a camera using computing methods, wherein the anomalies in the image result from a total or partial absorption or refraction by the defect, of the incident light projected by the light source. The digital image used for such an analysis is thus a digital intensity image, each pixel of which has a value proportional to the intensity of the light emitted by a point of the container optically corresponding to the pixel in the optical system of the camera. Such a detection in a digital intensity image generally serves to identify the location of defects on the container and, if appropriate, to identify the size and the shape of said defects, provided, however, that the defect leads to an anomaly in the absorption or the refraction of light with respect to the material of the container surrounding the defect.

Among the optical-computing methods which work in transmitted light, methods which determine the presence of residual mechanical stresses in the material, are also known, by determining the change in the state of polarization of the light after light has passed through the material of the container and has passed through any stress defects of the material. Polarimetric cameras are currently available to implement such methods.

Polarimetric cameras are known in particular, wherein the polarimetric camera includes a two-dimensional photoelectric sensor comprising photoelectric elements each comprising a photoelectric cell in front of which a polarization analysis system is arranged which will hereinafter be referred to as a polarization analyzer or simply an analyzer. The polarization analysis system comprises a linear polarizing filter, hereinafter referred to as an individual linear polarization analyzer or simply an individual linear analyzer, associated with each photocell of the photoelectric element. The photoelectric sensor includes a number N of distinct groups of contiguous photoelectric elements, each distinct group of contiguous photoelectric elements comprising four contiguous photoelectric elements belonging to four distinct families, respectively, of photoelectric elements. Each family of photoelectric elements is defined by the orientation of the axis of polarization of the individual linear analyzer thereof, the orientation of the axis of polarization of the individual linear analyzer being common to each of the photoelectric elements of the family. In known polarimetric cameras, the four linear analyses correspond to four orientations of the respective axis of polarization and correspond to two pairs of orthogonal axes of polarization, the two pairs being offset from each other by an angle of 45 degrees, along one direction or the other.

For example, the XCG-CP series polarimetric cameras sold by the companies of SONY Group, function according to such principle. The same companies of the SONY Group market two-dimensional photoelectric sensors which incorporate a system of individual linear polarizing filters each associated with a photoelectric cell according to the aforementioned principle. The sensors, known under the references IMX250MZR/MYR, IMX253MAR/MYR, or else IMX264MZR/MYR, of CMOS technology, comprise individual linear polarizing filters formed directly on the component. The invention will be described hereinafter in more detail in an embodiment using such a camera. Other manufacturers of cameras that may be implemented in the case of the invention include the company Lucid Vision Labs, Inc, 130-13200 Delf Place, Richmond B.C., Canada, V6V 2A2. Polarimetric sensors are also described in document EP-2.275.790. A device and an optical-computing method for analyzing a glass container in through light using a digital polarimetric camera are also described in document WO-2020/212014.

On the basis of the digital polarization images acquired with such polarimetric cameras, it is possible to locate, in an analyzed container, regions known as "stressed regions" wherein the glass material forming the container, exhibits residual mechanical stresses which result in a phase shift of the two orthogonal components of polarized light passing through the stressed regions, i.e. a phase shift between two orthogonal components of the electric field of the light. The residual mechanical stresses, generally of thermal origin, may result from the presence of an inclusion in the material (ceramic, metal, devitrified glass, etc.) or from the method of forming the container, such as thermal gradients created during forming and poorly resorbed in the annealing arch during the process of glass cooling. In any case, it is known that such stressed zones may be zones of unacceptable brittleness, making the container unsuitable for commercial use.

In a "stressed region", the material with residual mechanical stresses becomes birefringent, the refractive index of the material then being different along two orthogonal axes called fast and slow, oriented according to the direction of the residual mechanical stresses. When an electromagnetic wave crosses a "stressed region", a first component of the electric field of the wave propagates faster than the other component of the electric field, orthogonal to the first component, due to the birefringence of the material with residual mechanical stresses, thereby generating a phase shift p between the two components, the phase shift p being induced by the residual mechanical stresses. It should be noted that the phase shift p induced by the residual mechanical stresses is superimposed or is subtracted from an incident phase shift, if any, of the incident light.

In the techniques usually employed, it is possible to distinguish the techniques which use incident light polarized linearly, along an incident linear direction of polarization, from the techniques which use circularly polarized light with an incident direction of rotation.

Accordingly, in a method of detecting residual mechanical stresses consisting in illuminating the container with linearly polarized incident light, the polarization of the incident light is changed, during the travel through glass materials having residual mechanical stresses, into a resulting polarization of the emergent light coming from the material, hereafter called emergent polarization, the modification of polarization being dependent on the value of the residual mechanical stresses and on the angle between the direction of the residual mechanical stresses and the direction of incident linear polarization, as follows:

- if the direction of incident linear polarization is parallel or orthogonal to the direction of residual mechanical stress, the emergent polarization is a linear polarization of the same direction of polarization as the direction of incident linear polarization, i.e. there is no change in the state of polarization;
- otherwise the emergent polarization is an elliptical or circular polarization the direction of the major axis of which and ellipticity of which are dependent on the angle and the intensity of the stresses.

In methods that use linearly polarized incident light, the resulting polarization is analyzed using a linear analyzer, i.e. in practice generally using a linear polarizing filter. Generally, the elements are arranged in such a way that the direction of polarization of the linear analyzer is orthogonal to the direction of incident linear polarization, so that the image is black in the absence of phase shift p induced by residual mechanical stresses. Such preferred solution makes it possible to optimally dispense with absorption and refraction effects that reduce the intensity. In such configuration, when the polarization of the emergent light coming from the analyzed material has a change in polarization with respect to the incident linear polarization, the residual mechanical stresses are seen in the form of a higher light intensity, the value of which depends on the phase shift p induced by the residual mechanical stresses, but also on the direction of the stresses. Thereby, a higher light intensity can only be distinguished for residual mechanical stresses, the direction of which is neither parallel nor orthogonal to the direction of incident linear polarization. The detection is not isotropic and does not allow the entire stressed region to be seen, but only certain parts of said region. For example, if the stress is due to a spherical inclusion, it can be considered that the stresses generated are in radial compression around the inclusion. In such case, only 4 white spots are observed around the defect.

In methods which use circularly polarized incident light passing through a region having residual mechanical stresses, the circular polarization of the incident light is obtained by interposing in front of the light source successively and in the following order, along the direction of propagation of the light, a linear polarizer, referred to as a source linear polarizer, having a source direction of polarization, and a quarter-wave plate, referred to as a source quarter-wave plate.

During the passage of light through the object examined, residual mechanical stresses will generate an additional induced phase shift p between the two orthogonal components of the electric field of light. The emergent light, which comes from the material with residual mechanical stresses, thus exhibits emergent polarization which is then analyzed by means of a polarization analysis system which is generally what will hereinafter be referred to as a circular analyzer and which includes, successively and in the following order along the direction of propagation of the light, an analysis quarter-wave plate, then a linear polarization analyzer. The analysis quarter-wave plate transforms the circular polarization of the emerging light, which comes from the material, into an intermediate polarization, the state of polarization of which depends on the phase shift p induced by residual mechanical stresses, an induced phase shift p which is as such dependent on the intensity of the residual mechanical stress. If no residual mechanical stress is present along the trajectory, then the intermediate polarization is a linear polarization along a direction called the "direction of linear polarization without stress" which is oriented at 45° with respect to the direction of the fast axis of the analysis quarter-wave plate. Otherwise, in the presence of residual mechanical stresses in the material, the intermediate polarization is elliptical polarization, i.e. with a phase shift different from k/4 depending on the phase shift p induced by the residual mechanical stresses. The intermediate polarization is then further analyzed by means of the linear polarization analyzer (also known as the linear analyzer) of the circular analyzer. The linear analyzer, which is part of the circular analyzer, can take, in particular, the form of a linear polarizer filter.

In a circular analyzer, the linear analyzer that is part of the circular analyzer has a direction of polarization that is oriented at 45 degrees with respect to the fast axis of the analysis quarter-wave plate.

In cases where the illumination device delivers incident light which is circularly polarized along one direction, which will be arbitrarily referred to as the direction of incidence, a so-called inverse circular analyzer is a circular analyser, the orientation of the linear analyzer of which is such that, in the absence of residual mechanical stresses in the container being analyzed (and hence also in the absence of a container between the light source and the analyzer), the intensity received by the photoelectric sensor 22 is extinguished. We shall say that such an inverse circular analyzer presents a polarization analysis characteristic which is an inverse circular analysis. In such an inverse circular analyzer, the linear analyzer is arranged so that the direction of polarization thereof is orthogonal to the "unstressed direction of linear polarization" set by the fast axis direction of the analysis quarter-wave plate, so as to obtain an extinction if the polarization is not modified by a stress defect along the trajectory thereof through the container. In such a case, the intensity of the collected light, which depends only on the retardance generated by the residual mechanical stresses, is hence independent of the direction of the residual mechanical stresses and depends only on the intensity thereof.

Conversely, a circular analyzer the orientation of the axis of polarization of which of the linear analyzer is parallel to the "unstressed direction of linear polarization" set by the fast axis direction of the analysis quarter-wave plate, will be called a direct circular analyzer, so that, in the absence of a container between the light source and the analyzer, all incident light circularly polarized in the direction of incidence is integrally obtained on the photoelectric sensor. We will say that such a direct circular analyzer has a polarization analysis characteristic which is a direct circular analysis.

The value of a pixel of a digital polarization image measures a light intensity between 0 and a maximum gray level, corresponding, if the precaution is taken to prevent pixel saturation by appropriately adjusting the gain and the integration time, to the intensity of the incident light minus the absorption by the thickness of material traversed, i.e. Io, whether or not modified by changes in the state of polarization due to the residual mechanical stresses and to the analyzer of each pixel. Conventionally, an arbitrary digitization scale assigns to each gray level of the measured light intensity, a value ranging e.g. from 0 to 100% or from 0 to 255 (used for a binary coding on 8 bits). If a phase shift calculation is carried out, the phase shift scale can be designed so that each pixel of the phase shift image, e.g. between 0 and 255, can represent phase shifts of 0° to 900 or 0° to 180°, depending on the case. Of course, pixel values coded e.g. on 10 or 16 bits can be envisaged depending on the dynamics of the photoelectric elements of the sensor.

It should be thus understood that both digital polarization images and digital intensity images provide useful information on the possible presence of defects in the material of which the glass container is made. In an industrial process for controlling the quality of glass containers, it may also be desired to implement optical-computing methods of analysis using digital intensity images and digital polarization images. One solution would thus be to have two image acquisition devices, one to acquire digital polarization images, and the other to acquire digital intensity images. However, in an industrial context, the multiplication of checkpoints can be a handicap, both in terms of cost and in terms of space requirements. The latter point is particularly important if one wants to be able to implement an optical-computing method for on-line container analysis in an industrial line for the production of glass containers and/or in an industrial line for the automated transport of glass containers, and/or in an automated industrial line for filling glass containers.

According to another aspect, the acquisition of digital polarization images is very useful for the information that can be derived therefrom, especially in terms of residual mechanical stresses of the material, e.g., but the polarization information should be generally interpreted so as to determine whether the residual mechanical stress value that can be derived from the images is constitutive of a defect or not. For example, in a process of producing a glass container with engravings, it is almost inevitable that the regions with engravings will cause certain polarization phase shifts that should not lead to the rejection of the containers, because the material of the container has, at the engravings, residual stresses which, while being much higher than the residual stresses in the material outside the engravings, nevertheless remain entirely acceptable and do not compromise the quality of the container, and/or because the state of polarization of the light is modified by the refraction of the light on the sloping edges of the engravings, said modification being interpreted as a residual stress effect while the container is nevertheless entirely acceptable. In this way, it appears necessary to be able to correlate zones wherein a polarization phase shift is detected, with regions of the container wherein such polarization phase shifts can be expected, in order not to unnecessarily reject a container if appropriate.

In general, it is known that it is generally interesting to be able to subdivide the image of an inspected object, in the present case the image of a glass container, into different zones for which the image will be analyzed, if appropriate, with different algorithms and/or with different threshold levels. The above thus presupposes being able to correlate a zone of the image with a zone of the corresponding container. In intensity images, the above is generally well controlled, because there are known methods of shape recognition in intensity images via transmitted light, which make it possible e.g. to detect the edges of the container and to recognize geometric markers, if any. On the other hand, polarization images are conventionally images wherein only zones with a polarization phase shift can be seen, which is generally impossible to associate with a relative position on the container.

SUMMARY OF THE INVENTION

The invention thus aims to propose a method and an optical-computing device for analyzing glass containers using a polarimetric camera and which is both compact and economical while being apt to provide information used to limit the risk of needlessly rejecting containers.

With the aforementioned aim, the invention proposes an optical-computing device and method for analyzing, via transmitted light, a container made of transparent or translucent material such as glass, using a polarimetric camera, the polarimetric camera including a two-dimensional photoelectric sensor comprising photoelectric elements each comprising a photoelectric cell in front of which is arranged a polarization analysis system comprising at least one individual polarization analyzer associated with the photoelectric cell of the photoelectric element, the photoelectric sensor including a number N of distinct groups of contiguous photoelectric elements, each distinct group of contiguous photoelectric elements comprising a number K greater than or equal to two, of photoelectric elements belonging to one of a number F greater than or equal to two, of distinct families of photoelectric elements, respectively, each family of photoelectric elements being defined by a polarization analysis characteristic of the polarization analysis system common to each of the photoelectric elements thereof, the polarization analysis characteristics of at least two families comprising at least two linear analyses along two orthogonal axes of polarization or at least two circular analyses in opposite directions to each other, each distinct group of photoelectric elements comprising at least two photoelectric elements belonging to at least two distinct families, and each distinct group of contiguous photoelectric elements corresponding to a composite pixel in a master image delivered by the sensor.

The method includes:

- the illumination of the container from the rear by an illumination device delivering, onto the container, incident light, polarized either circularly with a first direction of rotation, or linearly along an axis of incidence polarization;
- the observation of the container from the front by the polarimetric camera, so as to collect emerging light coming from the container on the photoelectric sensor of the polarimetric camera;
- the acquisition, with the photoelectric sensor of the polarimetric camera, of at least one digital master image of the container, having a number K*N of master pixels corresponding to N distinct groups of contiguous photoelectric elements, the master image comprising N composite pixels, each composite pixel corresponding to one of the groups of contiguous photoelectric elements, and the master image comprising the number K of distinct partial images each having N partial pixels, the partial pixels of each partial image corresponding, for a given partial image, to only one family of photoelectric elements of the photoelectric sensor taken from the N composite pixels;

the computation of an intensity image wherein the value of each intensity pixel is an averaged value of the value of at least two partial pixels corresponding to two photoelectric elements of the same group, but belonging to two distinct families of photoelectric elements, the polarization analysis characteristics of which are two circular analyses of opposite directions to each other or two linear analyses with orthogonal axes of polarization or two orthogonal elliptical analyses;

the computation of at least one phase shift image by computing, for a series of composite pixels, a phase shift pixel which corresponds to a composite pixel and the value of which is representative of a polarization phase shift, induced by residual mechanical stress in the elementary zone of the container corresponding to the composite pixel, in the emerging light coming from the elementary zone of the container corresponding to the composite pixel, from the value of a set of one or a plurality of partial pixels all extracted from the composite pixel and belonging to a combination of one or a plurality of partial images, the computation of each phase shift pixel of a given phase shift image being carried out from the same combination of one or a plurality of partial images.

Such a method according to the invention can further comprise one or a plurality of the following optional features, taken alone or in combination.

In a series of variants, the optical-computing method of analysis can be such that:

the photoelectric sensor comprises at least two distinct families of photoelectric elements the polarization analysis characteristics of which are two linear analyses along a first axis of polarization and a second axis of polarization orthogonal to the first axis of polarization, respectively;

the incident light is linearly polarized along the second axis of polarization;

the computation of each phase shift pixel for a given phase shift image is performed from the value of at least the partial pixel (Ppk(n)) corresponding to the first axis of polarization;

the value of each intensity pixel of the intensity image is an averaged value of the value of two partial pixels extracted from the same composite pixel and each associated with one of the two families, the axes of polarization of which are orthogonal and/or two partial pixels each associated with one of two distinct families of photoelectric elements, the polarization analysis characteristics of which are two circular analyses of opposite directions to each other.

In a series of variants, the optical-computing method of analysis can be such that:

the photoelectric sensor comprises at least four distinct families of photoelectric elements, the polarization analysis characteristics of which comprise at least four linear analyses along axes of polarization comprising two pairs of orthogonal axes of polarization, the two pairs of axes of polarization being offset from each other by an angle of 45 degrees;

the incident light is circularly polarized along one direction of incidence;

the computation of each phase shift pixel for a given phase shift image is carried out from the values of the four partial pixels extracted from the same composite pixel and each associated with one of four distinct families of photoelectric elements, the polarization analysis characteristics of which are said linear analyses;

the value of each intensity pixel of the intensity image is an averaged value of at least two partial pixels extracted from the same composite pixel and each associated with two distinct families of photoelectric elements, the polarization analysis characteristics of which are two linear analyses of orthogonal axes of polarization.

In a series of variants, the optical-computing method of analysis can be such that:

the incident light is circularly polarized along one direction of incidence;

the photoelectric sensor comprises at least one family of photoelectric elements, the polarization analysis characteristic of which is a circular analysis in the opposite direction to the direction of incidence;

the computation of each phase shift pixel for a given phase shift image is carried out from at least the value of the partial pixel associated with the family, the circular analysis of which has the opposite direction to the direction of incidence;

the value of each intensity pixel of the intensity image is an averaged value of two partial pixels extracted from the same composite pixel and each associated with one of two families, the circular analyses of which are in opposite directions to each other and/or two partial pixels each associated to one of two distinct families of photoelectric elements, the polarization analysis characteristics of which are two linear analyses of orthogonal axes of polarization or two orthogonal elliptical analyses.

In a series of variants, the optical-computing method of analysis can be such that:

the photoelectric sensor comprises at least two distinct families of photoelectric elements, the polarization analysis characteristics of which are two circular analyses of opposite directions to each other;

the incident light is circularly polarized, the computation of each phase shift pixel for a given phase shift image is carried from the value of the two partial pixels extracted from the same composite pixel and each corresponding to one of the two circular analyses of opposite directions, the value of each intensity pixel of the intensity image is an averaged value of two partial pixels extracted from the same composite pixel and each associated with one of the two families, the circular analyses of which are inverse to each other and/or two partial pixels extracted from the same composite pixel and each associated with one of two distinct families of photoelectric elements, the polarization analysis characteristics of which are two linear analyses with orthogonal axes of polarization or two orthogonal elliptical analyses.

In certain variants, the optical-computing method of analysis may be such that the method comprises the computation of an intensity image wherein each intensity pixel is an averaged value of the value of a plurality of distinct pairs of partial pixels belonging to the same composite pixel, each distinct pair of partial pixels corresponding to a distinct pair of polarization analysis characteristics, each distinct pair of polarization analysis characteristics being chosen from one or a plurality of pairs of two circular analyses of opposite directions to each other, one or a plurality of pairs of two linear analyses with orthogonal axes of polarization, and/or one or a plurality of pairs of two elliptical analyses orthogonal to each other.

In certain variants, the optical-computing method of analysis may be such that same comprises:

- the recognition by computer, in the intensity image, of a known geometric marker of the container and the determination of the location thereof in the intensity image; and,
- using the localization link, in the respective images thereof, between the associated partial pixels (Ppk(n)), the intensity pixel (Pt(n)), the phase shift pixel (Pd(n)) and the composite pixel (Pc(n)):
  - the determination by computer of at least one region of interest in the phase shift image depending on the location of the geometric marker,
  - and the identification by computer of the presence of a stressed region in the region of interest of the phase shift image.

In certain variants, the optical-computing method of analysis can be such that the identification by computer of the presence of a stressed region takes into account the value of the phase shift pixels and the relative location thereof with respect to the geometric marker.

In certain variants, the optical-computing method of analysis may be such that the method comprises the determination by computer of the relative location of the stressed region on the container with respect to the geometric marker.

In certain variants, the optical-computing method of analysis may be such that the method comprises a computer step of classification of the stressed region which takes into account the relative location of the stressed region on the container with respect to the geometrical marker, determined by computer, and a quantity representative of a polarization phase shift, induced by a residual mechanical stress in the stressed region, in the emergent light coming from the stressed region, the quantity representative of a polarization phase shift being computed from the values of the partial pixels corresponding to the stressed region.

In certain variants, the optical-computing method of analysis may be such that the incident light has an energy spectrum comprised between 250 nm and 1000 nm and a width of less than 150 nm, preferentially a width of less than 100 nm.

In certain variants, the optical-computing method of analysis may be such that each distinct group of contiguous photoelectric elements comprises four photoelectric elements belonging to one of four distinct families, respectively, of photoelectric elements, the polarization analysis characteristics of the four families comprising four linear analysis families along axes of polarization comprising two pairs of orthogonal axes of polarization, the two pairs being offset from each other by an angle of 45 degrees, in one direction or in the other, and such that each distinct group of photoelectric elements comprises one photoelectric element belonging to each distinct family.

In certain variants, the optical-computing method of analysis may be such that the illumination device comprises a broad light source the dimensions of which, perpendicular to an axis of incidence from the light source to the container, are larger than the corresponding dimensions of the part of the container to be analyzed.

In certain variants, the optical-computing method of analysis may be such that optical absorption or refraction features are determined by computer in the intensity image in order to detect defects in the container.

In certain variants, the optical-computing method of analysis may be such that candidate pixels or candidate regions, the values of which are outside a given interval or different from the values of neighboring pixels or regions, are detected by computer in the master image or intensity image or phase shift image, for each candidate pixel or candidate region, the intensity pixel values and the corresponding polarization phase shift pixel values are computed, and each of the candidate pixels or candidate regions is classified by computer as a defect or as a non-defect and/or classified by computer as defects of different types among at least one elliptical bubble ("bouillon"), or one inclusion, from the values of the intensity pixels, the polarization phase shift values and from the relative location with respect to the geometric marker.

The invention further relates to a device for analyzing defects in transparent or translucent containers, via transmitted light:

- comprising an illumination device delivering circularly polarized incident light with an incidence direction of rotation, onto a container placed at an analysis location of the device,
- comprising a polarimetric camera, the polarimetric camera including a two-dimensional photoelectric sensor comprising photoelectric elements each comprising a photoelectric cell in front of which is arranged a polarization analysis system comprising at least one individual polarization analyzer associated with the photoelectric cell of the photoelectric element, the photoelectric sensor including a number N of distinct groups of contiguous photoelectric elements, each distinct group of contiguous photoelectric elements comprising four photoelectric elements belonging to four distinct families, respectively, of photoelectric elements, each family of photoelectric elements being defined by a polarization analysis characteristic of the individual polarization analyzer that is common to each of the photoelectric elements thereof,
- for each of the at least 4 families, the individual polarization analyzers associated with each of the four families are linear polarizing filters, the individual polarizing filters corresponding to a family having the same axis of polarization, the axes of polarization being distinct for the 4 families and the axes of polarization of the individual polarizing filters corresponding to the 4 families comprising two pairs of orthogonal axes of polarization, the two pairs being offset from each other by an angle 45 degrees in one direction or in the other,
- each distinct group of photoelectric elements comprising a photoelectric element belonging to each distinct family.

The device is characterized in that the polarization analysis system includes a quarter-wave plate of the incident light, which is interposed between the analysis location and the individual polarizing filters, and the fast axis of which is arranged at an angle of 45 degrees from the axis of polarization of the individual polarizing filters of one of the four families, in such way that the characteristics of the individual polarizing filters of polarization of the four families comprise two linear analyses along orthogonal directions and two circular analyses of opposite directions to each other.

The device may further include a computer system programmed to:

acquire, with the photoelectric sensor of the polarimetric camera, at least one digital master image of the container, having a number K*N of master pixels corresponding to N distinct groups of contiguous photoelectric elements, the master image comprising N composite pixels, each composite pixel corresponding to one of the groups of contiguous photoelectric elements, and the master image comprising the number K of distinct partial images each having N partial pixels, the partial pixels of each partial image corresponding, for a given partial image, to only one family of photoelectric elements of the sensor taken from the N composite pixels;

compute an intensity image (It) wherein the value of each intensity pixel (Pt(n)) is an averaged value of the value of at least two partial pixels (Ppk(n)) extracted from the same composite pixel (Pc(n)) and corresponding to two photoelectric elements of the same group (26(n)), but belonging to two distinct families of photoelectric elements the polarization analysis characteristics of which are two circular analyses of opposite directions to each other or two linear analyses with orthogonal axes of axes of polarization or two orthogonal elliptical analyses;

compute at least one phase shift image by computing, for a series of composite pixels, a phase shift pixel which corresponds to a composite pixel and the value of which is representative of a polarization phase shift induced by residual mechanical stress in the elementary zone of the container corresponding to the composite pixel, in the emerging light coming from the elementary zone of the container corresponding to the composite pixel, from the value of a set of one or a plurality of partial pixels all extracted from the composite pixel and belonging to a combination of one or a plurality of partial images, the computation of each phase shift pixel of a given phase shift image being carried out from the same combination of one or a plurality of partial images.

BRIEF DESCRIPTION OF THE DRAWINGS

FIG. 1 is a schematic view of a device according to the invention.

FIG. 2 is an exploded perspective schematic view of a few components of a photoelectric sensor of a polarimetric camera.

FIG. 3 is a schematic flat view of a few components of a photoelectric sensor of a polarimetric camera.

FIG. 4 is a diagram schematically illustrating a configuration of polarization analysis characteristics for a group of photoelectric elements of a polarimetric camera.

FIG. 5 is a diagram schematically illustrating another configuration of polarization analysis characteristics for a group of photoelectric elements of a polarimetric camera.

FIG. 6 is a diagram schematically illustrating yet another configuration of polarization analysis characteristics for a group of photoelectric elements of a polarimetric camera.

FIG. 7 is a diagram schematically illustrating a configuration of polarization analysis characteristics for a photoelectric sensor of a polarimetric camera.

FIG. 8 is a schematic view of another device according to the invention and illustrating a process for obtaining an intensity image and a phase shift image from a master image acquired by means of such a device.

FIG. 9 illustrates the link between partial images and the master image, and the possibility of obtaining intensity images from one or a plurality of pairs of partial images.

FIG. 10 illustrates a process of obtaining an intensity image and a phase shift image from a master image.

FIG. 11 illustrates the relationship between the value of a phase shift pixel and the actual phase shift value, for a series of variants of methods according to the invention.

FIG. 12 illustrates the relationship between the value of a phase shift pixel and the actual phase shift value, for another series of variants of methods according to the invention.

DETAILED DESCRIPTION

An optical device 10 for analyzing, via transmitted light, defects in a transparent or translucent container 12 is illustrated in FIG. 1.

Throughout the remainder of the description, the container 12 is made of glass. A device 10 is illustrated in FIG. 8.

In embodiments that are not shown, the container 12 is a container made of thermoplastic material, e.g. obtained by a thermoplastic preform extrusion blow molding method.

The container 12 is shown empty, which is not limiting, but in other embodiments, the container 12 is filled with a translucent or transparent liquid, i.e. a liquid that is not opaque.

The container 12 is shown with no closing means, e.g. a stopper, which is not limiting, but in other embodiments, the container 12 is closed. The device 10 is designed to, and apt to, implement an optical-computing method for analyzing, via transmitted light, a container made of transparent or translucent material such as glass, using a polarimetric camera.

More particularly, the device is designed to, and apt to, implement such a method in an industrial line for the production of containers made of transparent or translucent material such as glass and/or in an industrial line for the automated transport of containers made of transparent or translucent material such as glass, and/or in an automated industrial line for filling containers made of transparent or translucent material such as glass. In such lines, containers are transported, e.g. by a conveyor 14 of the line, along a trajectory of travel, along at least one line of successive containers along the trajectory. The speed of movement of the containers in such a line may be comprised e.g. between 150 and 1200 containers per minute.

The device 10 is designed and apt to be installed at a given station along such a line, in such a way as to implement the optical-computing method of analysis via transmitted light successively for each container 12 of the line of containers, at the time of passage of the container at an analysis location 13 of the device 10, at which location a container 12 should be placed in order to be analyzed by the device 10.

At the analysis location 13 of the device 10, the trajectory of travel of the containers may be a rectilinear trajectory or a curvilinear trajectory. In the illustration shown in FIG. 1, the trajectory of travel of the containers 12 is a rectilinear trajectory along a direction perpendicular to the plane of FIG. 1. In the illustration shown in FIG. 8, the trajectory of travel of the containers 12 is a rectilinear trajectory along the direction of arrow T. In the two examples, the analysis location 13 can be represented by a vertical axis which is fixed with respect to the device 10. For example, the container 12 may be considered to be placed at the analysis location 13 when a principal axis of the container 12, e.g. an axis of symmetry of the container, or e.g. an axis of symmetry of revolution of the container, coincides with the fixed vertical axis corresponding to the analysis location 13. In the example shown in FIG. 1, the device 10 is particularly designed to analyze the side wall of the container 12. In the example shown in FIG. 8, the device 10 is particularly designed to analyze the bottom wall of the container 12.

The device 10 comprises an illumination device 16 delivering incident light to the container 12 when the latter is at the analysis location 13 of the device 10. In other words, the illumination device 16 delivers incident light to the analysis location 13 of the device 10.

The device 10 further comprises a polarimetric camera 18 for acquiring at least one digital image of the container at the time of the passage thereof to the analysis location 13 of the device 10, the digital image thereby acquired being used in the analysis method described hereinbelow.

In the case of a transmitted light analysis device, the illumination device 16 includes a light source 16*a* which is arranged in the field of view of the polarimetric camera 18. Thereby, at the moment of the passage thereof at the analysis location 13 of the device 10, the container 12 to be analyzed is arranged between the illumination device 16 and the polarimetric camera 18 along the path of the incident light delivered by the illumination device 16. In other words, the analysis location 13 of the device 10 is arranged between the illumination device 16 and the polarimetric camera 18 along the path of the incident light delivered by the illumination device 16.

The incident light delivered by the illumination device 16 is a polarized light. The illumination device 16 may thereby include a light source 16*a* emitting non-polarized light and a source polarizer 16*b* interposed between the light source and the analysis location 13 of the device 10, at which site the container 12 should be placed in order to be analyzed by the device 10. In certain embodiments, the incident light, i.e. the light which arrives on the material of the container 12, is linearly polarized along an incidence axis of polarization. In such a case, the source polarizer 16*b* is a linear polarizer having an axis of polarization. For example, such a linear source polarizer may comprise a polaroid sheet or liquid crystals. However, certain embodiments implement circularly polarized incident light with a first direction of rotation, also called incident direction of rotation. In such a case, the source polarizer 16*b* is a circular polarizer. For example, a circular polarizer may be formed by a linear source polarizer 16*b*1 having a source axis of polarization and a quarter-wave plate 16*b*2 the fast axis of which, hereinafter the fast source axis, is offset by an angle of 45 degrees from the source axis of polarization.

Preferentially, the light source 16*a* is a broad light source. For example, the dimensions of the illuminating surface of the light source 16*a*, perpendicular to an axis of incidence from the light source 16*a* to the analysis location 13, are greater than the corresponding dimensions of the part to be analyzed of the container 12.

Preferentially, the incident light has an energy spectrum comprised within a wavelength band comprised as such between 250 nm and 1000 nm, the wavelength band having a width of less than 150 nm, preferentially less than 100 nm. With such a narrow energy spectrum, the incident light is close to being monochromatic light. Indeed, the effects of linear polarizers are optimized for a given wavelength. Moreover, it is obvious that if a quarter-wave plate is used, which is generally only suitable for a specific wavelength or a narrow wavelength band around the specific wavelength, the induced retardance is exactly one quarter of the wavelength only for the precise wavelength value or for the narrow wavelength band around said precise wavelength.

The polarimetric camera 18 includes a two-dimensional photoelectric sensor 22 apt to deliver digital images of a field of view determined by a lens 24 of the camera.

The two-dimensional photoelectric sensor 22 comprises photoelectric elements 26(*f,n,k*) each comprising a photoelectric cell 28(*f,n,k*) in front of which is arranged a polarization analysis system comprising at least one individual polarization analyzer 30(*f,n,k*) associated with the photoelectric cell 28(*f,n,k*) of the photoelectric element 26(*f,n,k*).

FIG. 2 shows an example of such a sensor, where it can be seen, in the enlarged detail, that the photocells 28(*f,n,k*) are arranged in a two-dimensional planar grid, and that the individual polarizing filters 30(*f,n,k*) each associated with a different photoelectric cell 28(*f,n,k*) are placed in front of the corresponding photoelectric cell 28(*f,n,k*). In the example shown in FIG. 2, the photoelectric sensor 22 further includes an array of microlenses 32(*f,n,k*), each of which being associated with a photoelectric element 26(*f,n,k*).

Each element of the polarization analysis system is interposed along the path of the light between the analysis location 13 of the device 10 and the photoelectric cells 28(*f,n,k*) of the photoelectric sensor 22, thus, in operation, between the container 12 and the photoelectric cells 28(*f,n,k*) of the photoelectric sensor 22. In certain embodiments, the polarization analysis system comprises at least one individual polarization analyzer 30(*f,n,k*), each individual polarization analyzer 30(*f,n,k*) being in the form of a linear polarizing filter, and at least one quarter-wave plate 34 common to a plurality of photoelectric elements 26(*f,n,k*), even common to all of the photoelectric elements 26(*f,n,k*).

In a preferential example, as illustrated in FIG. 1 and in FIG. 8, a quarter-wave plate 34 common to all the photoelectric elements 26(*f,n,k*) is interposed between the container 12 and the photoelectric cells 28(*f,n,k*) of the photoelectric sensor 22. The quarter-wave plate 34 is part of the polarization analysis system and may be referred to hereafter under the term analysis quarter-wave plate 34. Preferentially, the common analysis quarter-wave plate 34 is arranged interposed between the analysis location 13 and the individual polarization analyzers 30(*f,n,k*) in the form of linear polarizing filters.

An analysis quarter-wave plate 34 may be part of the polarimetric camera 18, either by being integrated into the photoelectric sensor 22, or by being placed between the lens 24 and the photoelectric sensor 22, or by being integrated into the lens 24. Alternatively, as in the example shown in FIG. 1 and FIG. 8, an analysis quarter-wave plate 34 may be placed between the analysis location 13 of the device 10, at which the container 12 should be placed for analysis, and the lens 24 of the polarimetric camera 18.

For a given photoelectric sensor, the photoelectric elements are divided into F distinct families 26(*f*) (with f an integer varying from 1 to F) with photoelectric elements 26(*f,n,k*). The number F of distinct families 26(*f*) is greater than or equal to two. In the preferential examples illustrated in FIGS. 3 to 8, the number F of distinct families 26 (*f*) is equal to 4. Each family 26(*f*) of photoelectric elements is defined by a polarization analysis characteristic of the polarization analysis system, an analysis characteristic which is common to each of the photoelectric elements 26(*f,n,k*) thereof, with, in the present case, the integer f taking the values 1 to 4. The analysis characteristics of the at least two 26(*f*) families comprise at least two linear analyses along two orthogonal axes of polarization or at least two circular analyses of opposite directions to each other.

In the case of a linear analysis, the polarization analysis characteristic is induced by a linear polarization analyzer and includes the orientation of the axis of linear polarization of the linear polarization analyzer. Indeed, a linear polarization analyzer is generally produced in the form of a linear polarizing filter.

In the case of a circular analysis, the characteristic of polarization analysis is the action on polarization induced by the circular analyzer, which is formed e.g. by a quarter-wave retardation plate followed, along the direction of propagation of the light, by a linear polarizing filter. The circular analysis characteristic includes the forward or reverse direction of the circular analysis of the corresponding circular analyzer. In the preferential examples comprising 4 or more distinct families 26(*f*), obtained with the presence of an analysis quarter wave plate, the polarization analysis characteristics of the at least four distinct families 26(*f*) may comprise e.g. at least two circular analyses of opposite directions to each other, one of the forward directions corresponding to the direction of incidence of a circular polarization of the incident light, the other being along the reverse direction with respect to the same incidence direction of circular polarization of the incident light.

In certain embodiments comprising a common quarter-wave plate, the other two polarization analysis characteristics will be so-called elliptical analyses corresponding to cases where the fast axis of the analysis quarter-wave plate is orthogonal or parallel to the axis of polarization of the linear analyzer that follows same within the polarization analysis system. More particularly, two elliptical analyses will be said to be orthogonal to each other when same result from the superposition of the same quarter-wave plate with respectively two linear analyzers having mutually orthogonal axes of polarization.

It should be noted that a photoelectric sensor 22 for a polarimetric camera according to the invention may include, in addition to the at least two families 26(*f*) comprising at least two linear analyses along two orthogonal axes of polarization or at least two circular analyses of opposite direction, neutral polarization photoelectric elements, i.e. without any polarization analyzer (polarizing filter, wave-plate, etc.) in front of the corresponding photocell.

For the same given photoelectric sensor 22, the photoelectric elements 26(*f,n,k*) are distributed in a number N of distinct groups 26(*n*) (with n an integer varying from 1 to N) of contiguous photoelectric elements 26(*f,n,k*). In a given group, the photoelectric elements 26(*f,n,k*) are contiguous, and thus are not separated by other photoelectric elements belonging to another group. Preferentially, all the photoelectric elements 26(*f,n,k*) of the photoelectric sensor belong to one of the groups 26(*n*). Preferentially, the groups are juxtaposed together in a repeating pattern on the two-dimensional surface of the photoelectric sensor 22. Such a group 26(*n*) of photoelectric elements 26(*f,n,k*) is illustrated e.g. in FIGS. 3 to 6. Each distinct group 26(*n*) of contiguous photoelectric elements 26(*f,n,k*) comprises a number K greater than or equal to two, of photoelectric elements belonging respectively to one of the number F greater than or equal to two, of distinct families of photoelectric elements, each distinct group 26(*n*) of photoelectric elements 26(*f,n,k*) comprising at least two photoelectric elements belonging to at least two distinct families 26(*f*). It should be noted that a group 26(*n*) of photoelectric elements 26(*f,n,k*) may include one or a plurality of neutral polarization photoelectric elements as defined hereinabove.

In certain embodiments, the number K of photoelectric elements in each group 26(*n*) is equal to the number F of distinct families 26(*n*) of photoelectric elements. In such a case, each group 26(*n*) of photoelectric elements 26(*f,n,k*) includes a single photoelectric element 26(*f,n,k*) of each distinct family 26(*n*) of photoelectric elements. For example, FIGS. 4 to 6 illustrate a part of a sensor 22 wherein each group 26 (*n*) of photoelectric elements 26 (*f,n,k*) includes four photoelectric elements each belonging to a distinct family 26 (*f*) among four distinct families 26 (*f*) of photoelectric elements 26 (*f,n,k*). In the example shown in FIG. 4, the four distinct families 26(*f*) correspond to four distinct polarization analyses, which are four linear analyses along four distinct axes of polarization, e.g. two pairs of orthogonal axes of polarization (A1, A3) and (A2, A4), the two pairs being offset from each other by an angle of 45 degrees, along one direction or the other.

In the example shown in FIG. 5, the four distinct families 26(*f*) correspond to four distinct polarization analyses, which comprise two linear analyses along two distinct axes of polarization, in the present case e.g. two orthogonal axes of polarization, and two circular analyses of directions R1 and R2 which are opposite to each other.

In the example shown in FIG. 6, the four distinct families 26(*f*) correspond to four distinct polarization analyses, which comprise two circular analyses of directions R1 and R2 which are opposite to each other, and two elliptical analyses E2, E4 which are orthogonal to each other.

The notation used in the present text identifies a photoelectric element 26(*f,n,k*), or a photoelectric cell 28(*f,n,k*) or an individual polarization analyzer 30(*f,n,k*) by the index triplet (*f,n,k*), the index f identifying the polarization family 26(*f*) to which said photoelectric element or photoelectric cell belongs, the index n identifying the group 26(*n*) to which the element belongs, and the index k identifying the order number thereof in the group. In cases where the number K of photoelectric elements in each group 26(*n*) is equal to the number F of distinct families 26(*n*) of photoelectric elements, one may choose to assign, to each photoelectric element 26(*f,n,k*) or photoelectric cell 28(*f,n,k*) or individual polarization analyzer 30(*f,n,k*), the same value at index f serving to identify the polarization family 26(*f*) to which said photoelectric element or photoelectric cell belongs, and to the index k serving to identify the order number thereof in the group, so that said photoelectric element or photoelectric cell can be denoted with a pair of only two indices (f,n) or (n,k), the two pairs being then equivalent.

In other embodiments, the number K of photoelectric elements in each group 26(*n*) is greater than the number F of distinct families 26(*n*) of photoelectric elements. In such a case, each group 26(*n*) of photoelectric elements 26(*f,n,k*) may comprise at least two photoelectric elements 26(*f,n,k*) belonging to the same family 26(*n*) of photoelectric elements.

It should be noted that the polarization analysis characteristic for a photoelectric element 26(*f,n,k*) is conditioned by the individual polarization analyzer 30(*f,n,k*) of the photoelectric element 26(*f,n,k*), but will also be conditioned by any other element of the polarization analysis system, in particular by an analysis quarter-wave plate 34 of the polarization analysis system. In the absence of a common analysis wave plate 34, the polarization analysis characteristic for a photoelectric element 26(*f,n,k*) is conditioned by the individual polarization analyzer 30(*f,n,k*) of the photoelectric element 26(*f,n,k*).

For example, in FIG. 3, in particular on the detail of the figure, the case of a sensor has been illustrated wherein a group 26(*n*) includes 4 photoelectric elements for which the individual polarization analyzers 30(*f,n,k*) associated with each of the four families are linear polarizing filters. The individual polarizing filters correspond to a given family have the same linear axis of polarization. The axes of polarization are distinct for the 4 families. In addition, the axes of polarization of the individual polarizing filters corresponding to the 4 families comprise two pairs (A1, A3) and (A2, A4) of orthogonal axes of polarization, the two pairs being offset from each other by an angle of 45 degrees, along one direction or the other.

In the absence of other elements in the polarization analysis system, the photoelectric sensor 22 of FIG. 3 thereby determines four families of photoelectric elements 26(*f,n,k*) which correspond to four distinct polarization analysis characteristics, the characteristics determined by the individual polarizing filters 30(*f,n,k*). Thereby, the four distinct polarization analysis characteristics are four linear analyses along the four distinct axes of polarization, e.g. two pairs (A1, A3) and (A2, A4) of orthogonal axes of polarization, the two pairs being offset from each other by an angle of 45 degrees, along one direction or the other. FIG. 4 illustrates such case.

However, if the same photoelectric sensor 22 of FIG. 3 is associated with a common analysis quarter-wave plate 34 for all photoelectric elements 26(*f,n,k*), which is interposed between the analysis location 13 of the device 10 and the individual polarizing filters 30(*f,n,k*), and the fast axis of which is arranged at an angle of 45 degrees from the axis of polarization of the individual polarizing filters of one of the four families, then one obtains a polarimetric camera for which the polarization analysis characteristics of the four families comprise two circular analyses of directions R1 and R2 which are opposite to each other, as illustrated in FIG. 6, and two analyses which can be arbitrarily qualified as elliptical analyses E2, E4 orthogonal to each other. In the example shown in FIG. 6, the fast axis of the common analysis quarter-wave plate 34 is positioned at an angle of 45 degrees with respect to the axis of polarization A1 of the individual polarizing filters of the sensor of FIG. 3. Therefore, the fast axis of the common analysis quarter-wave plate 34 is parallel or orthogonal to the axes of polarization A2, A4 of the individual polarizing filters of elements 26(2,*n*,2) and 26(4,*n*,4) of the sensor shown in FIG. 3, which forms for said elements, a characteristic of elliptical polarization analysis. We will see that the pixel value corresponding to the elliptical analyses will not be used for phase shift pixel calculations but can be used for intensity pixel calculations.

The groups 26(*n*) are distributed uniformly over the extent of the two-dimensional photoelectric sensor 22 or at least over the extent of a useful zone thereof, e.g. a zone excluding the edges of the array of photoelectric elements of the sensor. Preferentially, the groups 26(*n*) are distributed according to a regular tiling covering all the photoelectric cells of the photoelectric sensor 22, at least over the extent of a useful zone of the photoelectric sensor 22, without any hole.

In a given photoelectric sensor, all groups 26(*n*) of contiguous photoelectric elements can be identical to each other. In particular, it can be provided for all the groups 26(*n*) to include the same number of photoelectric elements 26(*f,n,k*) belonging to the same series of families 26(*f*). In such a case, within each group, the photoelectric elements belonging to the different families can be positioned with respect to each other in an identical manner within the respective group 26(*n*) thereof. Such is the case of the photoelectric sensor 22 illustrated in FIG. 7.

On the other hand, provision could be made for the groups 26(*n*) to differ in the positioning of the photoelectric elements belonging to the different families within the respective group 26(*n*) thereof. Similarly, provision could be made for the photoelectric sensor 22 to consist of distinct series of groups 26(*n*) of photoelectric elements, the groups of one series being different from the groups of another series.

In total, in the examples illustrated, the photoelectric sensor 22, or at least the effective zone thereof, e.g. a zone excluding the edges of the array of photoelectric elements of the sensor, comprises a number KxN of photoelectric elements 26(*f,n,k*) that can be used to implement a method as described hereinbelow.

In a preferential example, the photoelectric sensor 22 comprising 4 distinct families 26(*f*) of photoelectric elements 26(*f,n,k*), the polarization analysis system includes:

- an individual polarization analyzer 30(*f,n,k*) for each photoelectric element 26(*f,n,k*);
- for each of the 4 families, the individual polarization analyzers 30(*f,n,k*) associated with each of the four families are linear polarizing filters, the individual polarizing filters corresponding to a family having the same axis of polarization, the axes of polarization being distinct for the 4 families and the axes of polarization of the individual polarizing filters corresponding to the 4 families comprising two pairs (A1, A3) and (A2, A4) of orthogonal axes of polarization, the two pairs being offset from each other by an angle of degrees, along one direction or the other, as illustrated in FIG. 3;
- an analysis quarter-wave plate 34 common to all photoelectric elements 26(*f,n,k*), which is interposed between the analysis location 13 of the device 10 and the individual polarization analyzers 30(*f,n,k*), and the fast axis of which is arranged at an angle of 45 degrees, along a first direction, from the axis of polarization of the individual polarizing filters of one of the four families, and thus necessarily also arranged at an angle of 45 degrees, along a second direction opposite to the first direction, from the axis of polarization of the individual polarizing filters of another of the four families.

In such an example, it is thereby possible to have a photoelectric sensor 22 including a number N of distinct groups 26(*n*) of contiguous photoelectric elements 26(*f,n,k*) wherein each distinct group of photoelectric elements comprises a single photoelectric element belonging to each distinct family 26(*f*). Thereby, each distinct group 26(*n*) of contiguous photoelectric elements comprises four photoelectric elements 26(*f,n,k*) belonging to four distinct families 26(*f*), respectively, of photoelectric elements 26(*f,n,k*). With, the combination of the effects of the individual polarizing filters 30(*f,n,k*) and the common quarter-wave plate the fast axis of which is arranged at an angle of 45 degrees from the axis of polarization of the individual polarizing filters of one of the four families, the polarization analysis system is such that the polarization analysis characteristics of the four families in all cases comprise two circular analyses of opposite directions, as illustrated in FIG. 5 for a group 26(*n*), and in FIG. 7 for the photoelectric sensor 22. In addition to the two circular analyses of opposite directions to each other, one having a first direction and the other having a second direction opposite to the first, the polarization analysis characteristics of the four families further include, for two other families, two so-called elliptical polarizations.

The polarimetric camera 18, through the photoelectric sensor 22 thereof, thus delivers a digital image, called master image IM, which can include as many pixels, called master pixels Pm(*f,n,k*), as the number of photoelectric elements. In such a master image IM, it is possible to define groups of pixels, each group of pixels being hereinafter a composite pixel Pc(n), where each composite pixel Pc(n) groups together the master pixels Pm(*f,n,k*) which correspond to a given group 26(*n*) of contiguous photoelectric elements, as defined hereinabove. Thereby, to each distinct group 26(*n*) of contiguous photoelectric elements corresponds a composite pixel in the master image delivered by the photoelectric sensor 22. A composite pixel Pc(n) thus includes K master pixels Pm(*f,n,k*). A composite pixel Pc(n) can be considered as the image of an elementary zone of the imaged field, and thus in particular, an elementary zone of the container 12 which was at the analysis location 13 at the time of acquisition of the master image IM.

A device 10 as described hereinabove is an example of a device which serves to implement an optical-computing method of analyzing, via transmitted light, a container made of transparent or translucent material, such as glass, using a polarimetric camera.

The method includes computer steps, in particular computer steps to be carried out by a computer system 100, an example of which, symbolically illustrated in FIG. 1 and FIG. 8, can be produced in the form of at least one computing unit, e.g. a standard computer. The computer system 100 may comprise elements which are integrated into the polarimetric camera. Such a computer system 100 may thus include one or a plurality of microprocessors, one or a plurality of electronic memory units and one or a plurality of display interfaces (screen, projector, holographic display, etc.), input interfaces (keyboard, mouse, etc.) touchpad, touchscreen, etc.), and/or communication (USB, Ethernet®, Wi-Fi®, Bluetooth®, Zigbee®, etc.). The computer system may comprise a computer network sharing data with one or a plurality of other computers on the network, or with other networks, e.g., over an Internet or Ethernet® protocol. In addition to the obvious connection thereof to the polarimetric camera, in order to collect master images, the computer system can be connected to sensors giving information on the status of the installation, and/or to actuators of the installation (conveyors, ejectors, etc.). The computer system 100 can be connected to the illumination device 16, in order to acquire operating data therefrom, and/or to ensure the control of the illumination device. The computer system 100 implements one or a plurality of pieces of software stored and/or executed locally or remotely, including on one or a plurality of remote computer servers. The software program (s) preferentially comprise one or a plurality of software program(s), programmed to implement the computer steps of the method according to the invention.

In the device, the computer system, and in particular the computing unit thereof, is programmed to carry out all or part of the method which will be described hereinafter.

Such a method includes the illumination of the container 12 from the rear by the illumination device 16 which delivers, onto the container 12, incident light, polarized either circularly with a first direction of rotation, or linearly along an incidence axis of polarization.

Such a method includes, at the same time, the observation of the container 12, from the front, by the polarimetric camera 18, so as to collect, on the photoelectric sensor 22 of the polarimetric camera 18, emerging light coming from the container 12 located at the analysis site. The emergent light coming from the container 12 corresponds to the incident light delivered by the illumination device 16, but which has undergone a potential transformation because the light has traveled through the thickness of at least one wall of the container 12. The lens 24 of the camera is adjusted to form, on the photoelectric sensor 22, a clear optical image of the container 12.

For alternative methods wherein the polarization analysis characteristics of at least two families comprise two circular analyses, the method may include the interposition, between the container 12 and the photoelectric sensor 22, of the polarimetric camera 18, more precisely, between the container 12 and the individual polarization analyzers 30(*f,n,k*), a quarter-wave plate 34 corresponding to the incident light.

As illustrated schematically in FIG. 8, the method thus includes the acquisition, supervised by the computer system 100, with the photoelectric sensor of the polarimetric camera 18, of at least one digital master image IM of the container 12 which, at the time of acquisition, is located at the analysis location 13 of the device 10, the master digital image IM being the image of the emerging light coming from the container 12. It is considered that the master image IM has a number K*N of master pixels corresponding to N distinct groups 26(*n*) of contiguous photoelectric elements. A master image IM is schematically illustrated in FIG. 9 and in FIG. 10.

As defined hereinabove, it can be considered that the same master image IM comprises N composite pixels Pc(n), each composite pixel Pc(n) being a group of contiguous master pixels Pm(*f,n,k*) corresponding to one of the groups 26(*n*) of contiguous photoelectric elements 26(*f,n,k*), and each composite pixel Pc(n) being considered as the image of an elementary zone of the image field, hence of the container 12.

Moreover, as illustrated more particularly in FIG. 9, one can also consider that the master image IM comprises the number K of distinct partial images IPk (with k integer varying from 1 to K) each having N partial pixels Ppk(n), the partial pixels Ppk(n) of each partial image IPk corresponding, for a given partial image IPk, to a single family of photoelectric elements of the sensor 22, and each partial pixel being taken from one of the N composite pixels. A partial pixel Ppk(n) of a partial image IPk is thus a master pixel Pm(*f,n,k*) of the master image IM acquired by the polarimetric camera 18.

The method can thus comprise the computerized extraction of the partial images IPk from the master image IM. Each partial image IPk covers the same imaged zone as the imaged zone in the master image IM, but with a resolution divided by the number K of photoelectric elements 26(*f,n,k*) in a group 26(*n*) of contiguous photoelectric elements 26(*f, n,k*) as defined hereinabove. Each partial image IPk thus includes the same number N of pixels.

It should be noted that the partial images IPk being nothing other than subsets of the master image IM, same do not necessarily need to be extracted and processed as such in the computer system, in the sense e.g. that same do not need to be recorded separately from the master image IM. In other words, the partial images Ipk can be implemented as simple subsets of the master image IM. The partial pixels Ppk(n) are in fact stored in the master image IM, the positions or memory address thereof in the master image IM being known.

As illustrated in FIG. 10, for each composite pixel Pc(n), the computing unit 100 calculates an intensity pixel Pt(n) from at least two partial pixels Ppk(n) and a phase shift pixel Pd(n) from at least one partial pixel Ppk(n). In other words, the method comprises the computerized analysis of the composite pixels Pc(n) stored in the master image IM, from which an intensity image It and a phase shift image ID, which are analyzed to find defects, are directly obtained.

In a given partial image IPk, all the partial pixels Ppk(n) correspond to a single family of photoelectric elements 26*f* of the photoelectric sensor 22, thus to a single polarization analysis characteristic of the polarization analysis system. Advantageously, the partial images IPk can be superposed pixel by pixel. Indeed, for a given elementary zone of the container 13, it is known that the different master pixels Pm(*f,n,k*) of the composite pixel Pc(n) corresponding to the given elementary zone are distributed, in the form of partial pixels Ppk(n), in each partial image IPk, with a single master pixel Pm(*f,n,k*) of the composite pixel Pc(n), in the form of a partial pixel Ppk(n), in each partial image IPk. It is understood herein that, at the scale of the resolution of the master image IM, there is a shift between two partial images IPk, which shift being known as a function of the known shift between the photoelectric elements 26(*f,n,k*) within a group 26(*n*). On the other hand, at the scale of the resolution of the partial images IPk, the partial images IPk can be considered as perfectly and directly superposable, since two partial pixels Ppk(n) extracted from the same composite pixel will be images, admittedly partial, of the same elementary zone of the imaged field, hence of the container 12.

Among the K partial images Ipk thereby extracted, there are at least a number F of partial images IPk which, while covering the same imaged zone, are each acquired with a distinct polarization analysis characteristic.

FIGS. 9 and 10 schematically illustrate a method that can be implemented with a device comprising 4 distinct 26*f* families of photoelectric elements. In such a case, from a master image IM, 4 partial images IP1, formed of partial pixels Pp1(n), IP2, formed of partial pixels Pp2(n), IP3, formed of partial pixels Pp3(n), and IP4, formed of partial pixels Pp4 (n), can be extracted.

For example, in the case of a sensor with groups 26(*n*) of photoelectric elements as shown in FIG. 4, partial images IP1 and IP3 correspond to two polarization analysis characteristics which are two linear analyses of orthogonal axes of polarization A1 and A3, and the partial images IP2 and IP4 correspond to two polarization analysis characteristics which are two linear analyses of orthogonal axes of polarization A2 and A4, angularly offset from the two previous orthogonal axes of polarization A1 and A3

In the case of a sensor having groups 26(*n*) of photoelectric elements as illustrated in FIG. 5 or FIG. 6, the partial images IP1 and IP3 correspond to two polarization analysis characteristics which are two circular analyses of opposite directions to each other, R1 and R2. In the case of a sensor with groups 26(*n*) of photoelectric elements as illustrated in FIG. 5, the partial images IP2 and IP4 correspond to two polarization analysis characteristics which are two linear analyses of orthogonal axes of polarization A2 and A4. In the case of a sensor having groups 26(*n*) of photoelectric elements as illustrated in FIG. 6, the partial images IP2 and IP4 correspond to two polarization analysis characteristics which are two elliptical analyses E2, E4 orthogonal to each other.

However, for at least certain of the embodiments thereof, the invention could be implemented with only two distinct 26*f* families of photoelectric elements, so that only two partial images corresponding to two polarization analysis characteristics would be obtained which would be two linear analyses of orthogonal axes of polarization, or, preferentially, only two partial images corresponding to two polarization analysis characteristics, which would be two circular analyses of opposite directions to each other.

On the basis of the partial images IPk extracted from the same master image IM, the method comprises the computation, by the computer system 100, of an intensity image It composed of pixels of intensities It(n) computed from at least two partial pixels Ppk(n) belonging to two distinct partial images IPk and extracted from the same composite pixel Pc(n). Of course, the two partial pixels Ppk(n) belonging to the two distinct partial images IPk are two superposable partial pixels which, in the respective partial image Ipk thereof, occupy the same position, so that same are each the image, admittedly partial, of the same elementary zone of the imaged field, in particular of the container 12. More precisely, the value of each intensity pixel It(n) of an intensity image It is an averaged value of the value of at least two partial pixels corresponding to two photoelectric elements of the same group but belonging to two distinct families of photoelectric elements the polarization analysis characteristics of which are two circular analyses with opposite directions or two linear analyses of orthogonal axes of polarization or two elliptical analyses orthogonal to each other. In the present text, an averaged value may be e.g. an arithmetic mean or other mean, either weighted or not weighted, etc. For example, an averaged value of two values may be the sum of the two values.

In a simplest version, the intensity image It is composed of pixels with intensities It(n) computed from only two partial pixels Pt(n) belonging to only two separate partial images IPk, the distinct partial images corresponding to two circular analyses of opposite directions to each other or two linear analyses of orthogonal axes of polarization or two elliptical analyses orthogonal to each other. In such case, if the device includes only 2 distinct families 26*f* of photoelectric elements, the value of each intensity pixel is equal e.g. to Pt(n)=Pp1(n)+Pp3(n) or Pt(n)=Pp2(n)+Pp4(n).

However, in embodiments wherein at least four distinct families of photoelectric elements are available, in particular as described with reference to FIGS. 3 to 7, each intensity pixel can be computed as an averaged value of the 4 values, e.g. in the following way Pt(n)=Pp1(n)+Pp3(n)+Pp2(n)+Pp4(n).

Still in such embodiments wherein at least four distinct families of photoelectric elements are available, a first intermediate intensity image It1 and a second intermediate intensity image It2 can be computed, each according to the above principle but based on two distinct pairs of partial images and then a final intensity image can be established as the averaged value of the two intermediate intensity images It1 and It2 as illustrated in FIG. 9.

In the embodiments wherein at least four distinct families of photoelectric elements are available, in particular as described with reference to FIGS. 3 to 7, it will be possible to directly an intensity image wherein each intensity pixel Pt(n) is an average value of the value of the four partial values belonging to the same composite pixel, thus corresponding to four photoelectric elements of the same group but belonging to four distinct families of photoelectric elements the polarization analysis characteristics of which are two distinct pairs, respectively, of polarization analysis characteristics, each distinct polarization pair being chosen from one or a plurality of pairs of two circular analyses of opposite directions to each other, one or a plurality of pairs of two linear analyses of orthogonal axes of polarization, and/or one or a plurality of pairs of two elliptical analyses orthogonal to each other.

Theoretically, two pixels the respective values of which result from two linear analyses along mutually orthogonal axes, represent the two complementary components of light and the sum thereof restores the total intensity. Similarly, theoretically, two pixels the respective value of which results from two circular analyses of opposite directions represent the two complementary components of light and the sum thereof restores the total intensity. Similarly, theoretically, two pixels the respective values of which result from two orthogonal elliptical analyses represent the two complementary components of light and the sum thereof restores the total intensity. Therefore, assuming that one uses the value of two distinct pairs of partial pixels of the same analysis group, each pixel of the pair resulting from two circular analyses of opposite directions to each other, or from two linear analyses of orthogonal axes of polarization, or two elliptical analyses orthogonal to each other, the formula Pt(n)=Pp1(n)+Pp2(n)+Pp3(n)+Pp4(n) is twice the intensity. Of course, it is possible to normalize said value by dividing same by 2.

Of course, each intensity pixel Pt(n) is an image of the same elementary zone of the image field as that of the partial pixels used in the calculation of the averaged value.

In other words, in the example described, each intensity pixel Pt(n) is an averaged value of a composite pixel Pc(n) to which same corresponds.

In any case, the intensity images thereby obtained are images for which, for each elementary zone of the imaged field, a value representative of the intensity of the emerging light coming from said elementary zone is recovered, whatever the effective polarization of the emergent light coming from the elementary zone. If the emergent light coming from the elementary zone has a polarization, the pair or pairs of partial images used serve to obtain, by the averaged value, a representative value, whereas, in each partial image, the polarization may lead to a variably strong attenuation depending on the ratio between the effective polarization of the emerging light and the polarization analysis characteristic associated with the partial image IPk considered.

The method further includes the computation of at least one phase shift image ID, by calculating, for a series of composite pixels Pc(n), a phase shift pixel Pd(n) which corresponds to a composite pixel Pc(n) and the value of which is representative of a polarization phase shift φ(n), induced by a residual mechanical stress in the elementary zone of the container corresponding to the composite pixel Pc(n), in the emerging light coming from the elementary zone of the container corresponding to the composite pixel Pc(n). The value of a pixel of phase shift Pd(n) which corresponds to a composite pixel Pc(n) is thus representative of the difference between the phase shift between two orthogonal components of the electric field of the incident light, and on the other hand the phase shift between the two orthogonal components of the electric field of the emergent light, for the elementary zone of the container corresponding to the composite pixel Pc(n). It will be understood that the value of a phase shift pixel Pd(n) is thus an image of the intensity of the residual mechanical stresses in the material of the elementary zone of the container corresponding to the composite pixel Pc(n).

The value of each phase shift pixel Pd(n), for a given elementary zone defined by the index (n), is calculated from the value of a set of one or a plurality of partial pixels Ppk(n) all extracted from the composite pixel Pc(n) image of said elementary zone and belonging to a combination of one or a plurality of partial images Ppk(n). The computation of each phase shift pixel Pd(n) of a given phase shift image is performed, for all Pd(n) phase shift pixels of a given phase shift image, from the same combination of one or a plurality of partial images IPk.

A plurality of variants are possible for the calculation of the intensity image It and for the calculation of the phase shift image ID, in particular according to the device 10, more particularly according to the polarization analysis characteristics obtained using the device, and also as a function of the polarization of the incident light. We will first describe the different series of calculation variants of the phase shift image ID before describing how the intensity image It and the phase shift image ID are used in the method.

A first series of variants of the optical-computing method of analysis may be implemented in cases where the photoelectric sensor 22 implemented for the acquisition of the master image IM comprises at least two distinct families **26*f* of photoelectric elements the polarization analysis characteristics of which are two linear analyses, e.g., respectively along a first axis of polarization A1 and a third axis of polarization A3 orthogonal to the first axis of polarization A1. Of course, it could be implemented in the case of sensors including more distinct families 26*f* of photoelectric elements, with other polarization analysis characteristics, e.g. with sensors having the configurations shown in FIGS. 3 to 5**, but some of the families could then remain unused.

In the first series of variants of the method, the incident light will be linearly polarized along the second axis of polarization A3.

At least one first partial image IP1 associated with polarization analysis along the first axis of polarization A1, formed by pixels Pp1(n), and a second partial image IP3 associated with polarization analysis along the second axis of polarization A3, formed by pixels Pp3(n), are thereby obtained and used.

In the first series of variants of the optical-computing method of analysis, the computation of each phase shift pixel Pd(n) for a given phase shift image ID is carried out from the value of at least the partial pixel Pp1(n) corresponding to the first axis of polarization, i.e. the partial pixel which corresponds to the composite pixel Pc(n) and which appears in a first partial image IP1 associated with the polarization analysis along the first axis of polarization perpendicular to the axis of polarization A3 of the incident light. For example, each phase shift pixel Pd(n) is equal to the value of the partial pixel Pp1(n) corresponding to the first axis of polarization, with: Pd(n)=Pp1(n).

It should be understood herein that the value of the partial pixel Pp1(n) corresponding to the first axis of polarization will, in the absence of stress in the material traversed, be a value equal to zero. Indeed, the incident light is linearly polarized along the orientation of the second axis of polarization (herein the axis A3), but, in the first partial image IP1 associated with the polarization analysis characteristic along the first axis of polarization (herein the axis A1), only the light polarized perpendicular to the incident light polarization, is retained. If the latter was not subject, in an elementary zone of the material, to a phase shift induced by residual mechanical stresses, the emergent light coming from the elementary zone will have the same polarization as the incident light, so that the corresponding pixel Pp1(n) will have a value equal to zero corresponding to a zero light intensity.

It should be noted herein that the first series of variants of the method has limitations. Indeed, the relationship between the value of the phase shift pixel Pd(n), which is equal to the value of the partial pixel Pp1(n) corresponding to the first axis of polarization, and the value of the polarization phase shift φ(n), also depends on the orientation of the residual stresses. Indeed, the maximum value taken by the phase shift pixel Pd(n) depends on the orientation of the residual stress with respect to the orientation of the axis of polarization of the incident light and, as a corollary, the orientation of the sensor. However, despite such limitations, the first series of variants of the method may prove sufficient for certain applications, e.g. to detect residual mechanical stresses as soon as the phase shift exceeds a threshold, which is less than 90°, but without the possibility of discrimination on the phase shift value when the latter is above 90°. The anisotropic character of the detection is not necessarily too inconvenient insofar as, around a given defect such as the inclusion of foreign bodies, different orientations will be found for the residual mechanical stresses generated around the defect, so that there will always be certain orientations of the residual mechanical stresses that will be detectable, if not measurable.

Still in the first series of variants of the optical-computing method of analysis, the value of each intensity pixel Pt(n) of the intensity image It(n) is an averaged value of the value of two partial pixels Pp1(n), Pp3(n) extracted from the same composite pixel Pc(n) and each associated with one of the two families, the linear axes of polarization of which are orthogonal, and/or, in the variants of the first series where in addition two partial images IP2, IP4 associated with two other orthogonal linear analyses are available, two partial pixels Pp2(n), Pp4(n) each associated with one of two distinct families of photoelectric elements, the polarization analysis characteristics of which are two orthogonal linear analyses.

In the first series of variants of the optical-computing method of analysis, the value of each intensity pixel Pt(n) of the intensity image It(n) can be calculated e.g. in one of the following forms:

$$Pt(n) = Pp1(n) + Pp3(n), \text{ or}$$

$$Pt(n) = Pp2(n) + Pp4(n), \text{ or}$$

$$Pt(n) = [Pp1(n) + Pp2(n) + Pp3(n) + Pp4(n)]/2 \text{(the factor 1/2 is optional but serves to normalize the value).}$$

A second series of variants of the optical-computing method of analysis may be implemented in cases where the photoelectric sensor 22 implemented for the acquisition of the master image IM comprises at least four distinct families of photoelectric elements, the polarization analysis characteristics comprising at least four analyses linear along axes of polarization comprising two pairs of orthogonal axes of polarization, the two pairs of axes of polarization being offset from each other by an angle of 45 degrees. The photoelectric sensor 22 is e.g. one of the sensors used in commercially available photoelectric cameras, as described hereinabove. Such a photoelectric sensor thus has groups 26(*n*) of photoelectric elements as illustrated in FIG. 4.

In the second series of variants of the method, the incident light will be circularly polarized along one direction of incidence.

Thereby, at least four partial images IP1, IP2, IP3, IP4, formed of pixels Pp1(n), Pp2(n), Pp3(n), and Pp4(n), respectively, are obtained and used, each of which is associated with the polarization analysis characteristic along a first axis of polarization A1 having an arbitrary orientation Oref, a second axis of polarization A2 having an orientation Oref+ 45°, a third axis of polarization A3 having an orientation Oref+900 and a fourth axis of polarization A4, respectively, having an orientation Oref+135°.

In the second series of variants of the optical-computing method of analysis, the computation of each phase shift pixel Pd(n) for a given phase shift image ID is carried out from the values of the four partial pixels Pp1(n), Pp2(n), Pp3(n), and Pp3(n) each associated with one of the four distinct families of photoelectric elements the polarization analysis characteristics of which are said four linear analyses.

From said images, Stokes parameters can be determined for the emergent light coming from an elementary zone of the imaged field, hence from an elementary zone of the container. Herein, a calculation formula is given as an example, which is valid at least when the source circular polarizer 16*b* includes a linear polarizer 16*b*1, the axis of polarization of which is oriented at 45° from the fast axis of a source quarter-wave plate 16B2 which is situated downstream of the linear polarizer 16*b*1 along the direction of propagation of the incident light:

$$\begin{bmatrix} S0 \\ S1 \\ S2 \\ S3 \end{bmatrix} = \begin{bmatrix} Pp1(n) + Pp3(n) \\ Pp1(n) - Pp3(n) \\ Pp2(n) - Pp4(n) \\ \sqrt{S0^2 - S1^2 - S2^2} \end{bmatrix}$$

Moreover, it is also possible to express, in the context of a device as illustrated hereinbelow, the Stokes parameters as a function of the phase shift value in the following form:

$$\begin{bmatrix} S0 \\ S1 \\ S2 \\ S3 \end{bmatrix} = \begin{bmatrix} 1 \\ \sin(2\theta)\sin(\varphi) \\ -\cos(2\theta)\sin(\varphi) \\ -\cos(\varphi) \end{bmatrix}$$

As a result, the value of the phase shift pixel Pd(n) representative of the polarization phase shift φ(n) can be expressed in particular, e.g. in the form of one or other of the following two formulas:

According to a first formula $$\varphi(n) = Pd(n) = \arcsin\left(\sqrt{S_1^2 + S_2^2}\right)$$

The formula can be written, depending on the partial pixel values:

$$\varphi(n) = Pd(n) = \arcsin\left(\sqrt{(Pp1(n) - Pp3(n))^2 + (Pp2(n) - Pp4(n))^2}\right)$$

The formula can else be written, as a function of the master pixel values $$\varphi(n) = Pd(n) = \arcsin\left(\sqrt{(Pm(1, n) - Pm(3, n))^2 + (Pm(2, n) - Pm(4, n))^2}\right)$$

According to a second formula:

$$\varphi(n) = Pd(n) = arcos(S3)$$

The two calculation methods make it possible to calculate the polarization phase shift value φ(n), but only for polarization phase shift values φ(n) less than 90°. It can be seen in FIG. 11 that the value of the phase shift pixel Pd(n) is a proportional bijective function, herein increasing, of the polarization phase shift φ(n) for polarization phase shift values ranging from an angle of 0 to an angle of 90 degrees, changing from 0 to a maximum value Pd(n)max over said range, but the value of the phase shift pixel Pd(n) then decreases from the maximum value Pd(n)max to 0 for polarization phase shift values φ(n) ranging from an angle of 90 to an angle of 180 degrees, before growing again from 0 to the maximum value Pd(n)max for polarization phase shift values φ(n) ranging from an angle of 180 to an angle of 270 degrees, etc., periodically. Indeed, in the first formula, an arcsine of a square root is calculated. The measure of φ(n) is a triangle function of ·(n), i.e. for φ(n) varying from 0 to 90°, φ(n) is indeed obtained, and for φ(n) varying from 900 to 180°, the value (180°-φ(n)) is actually obtained. On the other hand, over the range from 0 to 90° of the polarization phase shift values, the second series of variants of the method makes it possible to obtain the polarization phase shift value independently of the orientation of the defect.

Still in the second series of variants of the optical-computing method of analysis, the value of each intensity pixel Pt(n) of the intensity image It(n) is e.g. an averaged value of at least two partial pixels each associated with two distinct families of photoelectric elements, the polarization analysis characteristics of which are two linear analyses of orthogonal axes of polarization.

In the second series of variants of the optical-computing method of analysis, the value of each intensity pixel Pt(n) of the intensity image It(n) can be calculated, e.g., in one of the following forms:

$$Pt(n) = Pp1(n) + Pp3(n), \text{ or}$$

$$Pt(n) = Pp2(n) + Pp4(n), \text{ or}$$

$$Pt(n) = [Pp1(n) + Pp3(n) + Pp2(n) + Pp4(n)]/2 \text{(the factor 1/2 is optional, but serves to normalize the value)}.$$

A third series of variants of the optical-computing method of analysis can be implemented in cases where the incident light is circularly polarized along one direction of incidence, and wherein the photoelectric sensor 22 comprises at least one family 26*f* of photoelectric elements, the polarization analysis characteristic of which is a circular analysis along the opposite direction to the direction of incidence.

In the third series of variants of the method, the computation of each phase shift pixel for a given phase shift image is performed on the basis of at least the value of the partial pixel associated with the family, the circular analysis of which is in the opposite direction to the direction of incidence.

Moreover, the value of each intensity pixel of the intensity image is an averaged value of two partial pixels each associated with one of two families, the circular analyses of which are in opposite directions to each other and/or two partial pixels each associated with one of two distinct families of photoelectric elements, the polarization analysis characteristics of which are two linear analyses of orthogonal axes of polarization or two elliptical analyses orthogonal to each other.

In the third series of variants of the method, one can use e.g. a photoelectric sensor having only two families 26*f* of photoelectric elements, the respective polarization analysis characteristics of which are circular analyses of opposite directions to each other, or use only the two families of a sensor with other families 26*f* of photoelectric elements, as e.g. with the configurations shown in FIGS. 5 and 6. A photoelectric sensor with a family 26*f* of photoelectric elements can be used, the polarization analysis characteristic of which is a circular analysis in the opposite direction to the direction of incidence, and two families 26*f* of photoelectric elements, the respective polarization analysis characteristics of which are linear analyses of orthogonal axes of polarization or elliptical analyses orthogonal to each other, or use only the three families of a sensor having other families 26*f* of photoelectric elements.

In the third series of variants of the method, it is of course possible to use a photoelectric sensor 22 having groups 26(*n*) of photoelectric elements as illustrated in FIG. 5 or in FIG. 6. In the case of a photoelectric sensor 22 having groups 26(*n*) of photoelectric elements as illustrated in FIG. 5 or FIG. 6, we will take the example wherein one obtains and uses as follows:

- a partial image IP1 associated with the circular analysis characteristic of opposite direction to the direction of incidence, formed by pixels Pp1(n);
- a partial image IP2 associated either, for the case of the configuration shown in FIG. 5, to the characteristic of polarization analysis along a first axis of polarization, herein the axis A2, or, for the case of the configuration shown in FIG. 6, to a first elliptical analysis, herein E2; the partial image IP2 being formed from the pixels Pp2(n)
- a partial image IP4 associated either, in the case of the configuration shown in FIG. 5, to the polarization analysis characteristic along another axis of polarization, herein the axis A4, perpendicular to the first axis of polarization which is herein the axis A2, or, in the case of the configuration shown in FIG. 6, to another elliptical analysis, herein E4, orthogonal to the first elliptical analysis E2, the partial image IP3 being formed of pixels Pp4(n).

With the above conventions, each phase shift pixel for a given phase shift image is calculated from at least the value of the partial pixel Pp1(n) associated with the family the circular analysis of which is in the opposite direction to the direction of incidence. Such family, wherein the pixel values for the calculation of the phase shift image are extracted, is the family for which, in the absence of residual mechanical stress, the value of the pixels of the family is zero. In other words, the partial image from which the phase shift image can be calculated is the image for which, in the absence of residual mechanical constraint, the partial image is black.

For example, each phase shift pixel Pd(n) is equal to the value of the partial pixel Pp1(n) corresponding to the circular analysis of the opposite direction to the direction of incidence, with: Pd(n)=Pp1(n). Still with same conventions for the third series of variants of the optical-computing method of analysis, the value of each intensity pixel Pt(n) of the intensity image It(n) can thus be calculated, e.g., in the following form:

$$Pt(n) = Pp2(n) + Pp4(n),$$

or, as explained hereinabove, in particular if a photoelectric sensor 22 is used having groups 26(*n*) of photoelectric elements as shown in FIG. 5 or FIG. 6, the intensity image It(n) can also be calculated e.g. as follows:

$$Pt(n) = Pp1(n) + Pp4(n),$$

or else $$Pt(n) = [Pp1(n) + Pp4(n) + Pp2(n) + Pp4(n)]/2.$$

It should be noted that a photoelectric sensor 22 having groups 26(*n*) of photoelectric elements as illustrated in FIG. 6, can be obtained by using a photoelectric sensor wherein the fast axis of the common wave plate is arranged at an angle of 45 degrees from the axis of polarization of the individual polarizing filters 30(*f,n,k*) of the family for which the pixel values are extracted for the calculation of the phase shift image.

A fourth series of variants of the optical-computing method of analysis can be implemented in cases where the photoelectric sensor 22 implemented for the acquisition of the master image IM comprises at least two distinct families of photoelectric elements the polarization analysis characteristics of which are, this time, two analyses circular in opposite directions, and where the incident light is circularly polarized along one direction of incidence. At least one partial image IP1 associated with the circular analysis characteristic along the opposite direction to the incidence, formed of the partial pixels Pp1(n), and a second partial image IP3 associated with the circular analysis characteristic along the direction corresponding to the incidence direction, formed of the partial pixels Pp3(n), are thereby obtained.

In the fourth series of variants of method of the optical-computing analysis, the computation of each phase shift pixel Pd(n) for a given phase shift image ID is carried out from the value of the two partial pixels Pp1(n) and Pp3(n) each corresponding to one of the two circular analyses of opposite directions to each other.

From said images, Stokes parameters can be determined for the emergent light coming from an elementary zone of the imaged field, hence from an elementary zone of the container:

$$\begin{bmatrix} S0 \\ S1 \\ S2 \\ S3 \end{bmatrix} = \begin{bmatrix} Pp1(n) + Pp3(n) \\ Pp1(n) - Pp3(n) \\ Pp2(n) - Pp4(n) \\ \sqrt{S0^2 - S1^2 - S2^2} \end{bmatrix}$$

In the fourth series of variants, the formula is expressed with the convention described hereinabove. In particular, with said convention, the value of the partial pixels Pp1(n) associated with the circular analysis characteristic of opposite direction to the direction of incidence will be zero in the absence of any residual mechanical stress. In other words, the partial image IP1 associated with the circular analysis characteristic opposite the direction of incidence will be the image for which, in the absence of any residual mechanical stress, the partial image is black.

Moreover, it is also possible to express, in the context of a device as illustrated hereinbelow, the Stokes parameters as a function of the phase shift value·in the following form:

$$\begin{bmatrix} S0 \\ S1 \\ S2 \\ S3 \end{bmatrix} = \begin{bmatrix} 1 \\ -\cos(\varphi) \\ -\cos(2\theta)\sin(\varphi) \\ -\sin(2\theta)\sin(\varphi) \end{bmatrix}$$

As a result, the value of the phase shift pixel Pd(n) representative of the polarization phase shift value φ(n) can be expressed e.g. with one or other of the following two formulas:

According to a first formula:

$$Pd(n) = \varphi(n) = 2\arctan\left(\sqrt{\frac{S0 + S1}{S0 - S1}}\right)$$

The formula can else be written, as a function of the partial pixel values or as a function of the master pixel values:

$$Pd(n) = \varphi(n) = 2\arctan\left(\sqrt{\frac{Pp1(n)}{Pp3(n)}}\right) = 2\arctan\left(\sqrt{\frac{Pm(1, n)}{Pm(3, n)}}\right)$$

According to a second formula:

$$Pd(n) = \varphi(n) = arcos(-S1) = arcos(Pp3(n) - Pp1(n)) = arcos(Pm(3, n) - Pm(1, n))$$

The two calculation methods make it possible to calculate the phase shift value, but herein advantageously for polarization phase shift values φ(n) ranging from 0° to 180°. Indeed, we calculate arccosine of a cosine. It can be seen in FIG. 12 that the value of the phase shift pixel Pd(n) determined by the formulae is a proportional bijective function, herein increasing, of the real polarization phase shift φ(n) for polarization phase shift values ranging from an angle of 0 to an angle of 180 degrees, changing from 0 to a maximum value Pd(n)max over said range, but the value of the phase shift pixel Pd(n) then decreases from the maximum value Pd(n)max to 0 for polarization phase shift values φ(n) ranging from an angle of 180 to an angle of 360 degrees, before growing again from 0 to the maximum value Pd(n)max for polarization phase shift values φ(n) ranging from an angle of 360 to an angle of 720 degrees, etc., periodically. The measurement of the pixel value of the phase shift Pd(n) by said formula is called a triangle function of the real polarization phase shift φ(n), i.e. for a real polarization phase shift φ(n) varying from 0 to 180°, ·(n) is measured, and for a real polarization phase shift φ(n) varying from 1800 to 360°, (360°-φ(n)) is measured. In this way, the detection of defects generating residual mechanical stresses is improved and it is possible to discriminate the defects by the polarization phase shift value φ(n) that same produce between an angle of 0 to 180 degrees. The above means that a defect the image of which has a plurality of phase shift pixels approaching the Pd(n)max value, contains stronger stresses than a defect the image of which with phase shift pixels that do not reach said value (same may contain portions with a phase shift greater than 180° which will be underestimated). Discrimination becomes better between stresses of different values, in other words it is easier to reject or retain defects depending on the stress: it is possible to reject stresses that have produced a phase shift greater than 90° without rejecting stresses that have produced a phase shift of less than 90°, whereas with a range of measurements limited to 90° it is necessary to reject phase shifts of less than 90° to be sure to reject the phase shifts between 9° and 180°. It is also observed that the measurement between 0 and 180 degrees is isotropic, because the measured polarization phase shift value φ(n) does not depend on the orientation of the stress of the defect but only on the value thereof.

Still in the fourth series of variants of the optical-computing method of analysis, the value of each intensity pixel Pt(n) of the intensity image It(n) is an averaged value of two partial pixels Pp1(n), Pp3(n), each associated with one of the two families the circular analyses of which are along opposite directions to each other, and/or, in the variants of the fourth series where one would also have two partial images IP2, IP4 associated with two linear analyses along orthogonal axes of polarization A2, A4 (cf. case of FIG. 5), two partial pixels Pp2(n), Pp4(n) each associated with one of two distinct families of photoelectric elements the polarization analysis characteristics of which are two linear analyses of orthogonal axes of polarization A2, A4, and/or, in the variants of the fourth series where one would have, in addition, two partial images IP2, IP4 associated with two orthogonal elliptical analyses (cf. case of FIG. 6), two partial pixels Pp2(n), Pp4(n) each associated with one of two distinct families of photoelectric elements the polarization analysis characteristics of which are two orthogonal elliptical analyses.

In the fourth series of variants of the optical-computing method of analysis, the value of each intensity pixel Pt(n) of the intensity image It(n) can therefore be calculated, e.g., in one or the other of the following forms:

$$Pt(n)=Pp1(n)+Pp3(n), \text{ or}$$

$$Pt(n)=Pp2(n)+Pp4(n), \text{ or}$$

$$Pt(n)=Pp1(n)+Pp2(n)+Pp3(n)+Pp4(n).$$

In the second and fourth series of variants, the calculation of each phase shift pixel for a given phase shift image is carried out from the value of at least two partial pixels, the at least two partial pixels being extracted from the same composite pixel and corresponding to at least two linear analyses of orthogonal axes of polarization or at least two circular analyses of opposite directions to each other.

In all of the above cases, the method thus leads to obtaining an intensity image It, which is analogous to a conventional image in transmission, and of a phase shift image ID, wherein it is possible at least to detect, and in certain cases to measure, at least in a relative manner, residual mechanical stresses, using only one camera.

Thereby, on such basis, it can be provided that the analysis method comprises a step of computer recognition, in the intensity image, of a known geometric marker of the container and the determination of the location thereof in the intensity image. A known geometric marker of the container can comprise one or a plurality of edges or contours of the container, and/or one or a plurality of engravings, inscriptions or other marking of the container, and/or the center of the push-up of certain bottoms. The step of computer recognition, in the intensity image, of a known geometric marker of the container can be carried out in the usual way by all the image analysis methods usually used, in particular the methods implemented in the context of known methods of optical-computing analysis for the analysis of containers made of transparent or translucent material such as glass. For example, an adjustment phase allows the signature of the marker to be recorded or the geometric and/or photometric characteristics thereof to be entered in the intensity image. During the localization, one looks in the image for the plausible position and orientation of the marker. The relative position in the image of the other elements is then deduced therefrom, on the basis of the fact that the location of the marker informs about the relative position of the container 12 with respect to the image sensor 18 at the moment of the capture. By having thereby identified, in the intensity image It, the known geometric marker, one becomes able to match each intensity pixel Pt(n) of the intensity image with a localization of an elementary zone of the container of which the intensity pixel Pt(n) is the image.

However, by construction, we have seen that the partial images IPk derived from the same master image, and consequently the intensity image(s) it, and the phase shift image(s) ID which are constructed according to the different variants of the method, are all superposable pixel by pixel, in the sense that two partial pixels Ppk(n) extracted from the same composite pixel will be images, admittedly partial, of the same elementary zone of the imaged field, and therefore of the container 12, and that the pixels of intensity Pt(n) and the phase shift pixels Pd(n) calculated on the basis of master or partial pixels belonging to the same composite pixel (thus corresponding to the same group 26(*n*) of contiguous photoelectric elements), will therefore also be associated with the same elementary zone of the imaged field, thus of the container 12. There is thus a localization link between the associated partial pixels, the intensity pixel, the phase shift pixel and the composite pixel.

Also, by using the localization link, in the respective images thereof, between the associated partial pixels, intensity pixel, phase shift pixel and composite pixel, the method can be designed to:

provide the determination by computer of at least one region of interest in the phase shift image as a function of the location of the geometric marker, and provide the identification by computer of the presence of a stressed region in the region of interest of the phase shift image.

The region of interest in the phase shift image may correspond to a particular zone of the container, e.g. all or part of the rim, of the neck, of the shoulder, of the body, of the bottom, etc. of the container. The region of interest in the phase shift image can be a zone with a particular known and identifiable marking, engraving, protuberance, geometry. The region of interest in the phase shift image may, on the contrary, correspond to a zone that excludes any marking, engraving, and/or protuberance.

More generally, the region of interest in the phase shift image corresponds to a zone of the container for which residual mechanical stresses are to be analyzed. If a plurality of regions of interest are determined in the phase shift image, each can correspond to a zone of the container for which it is desired to analyze residual mechanical stresses differently than for the other regions of interest, e.g. with a different threshold criterion.

The computer identification of the presence of a stressed region in the region of interest of the phase shift image is advantageously carried out by computer analysis taking into account the value of the phase shift pixels and the relative location thereof with respect to the geometric marker. Herein, the usual analysis techniques can be implemented, such as general or local contrast modifications, segmentations into regions or objects, looking for contours, comparisons of pixel values with each other, comparisons of pixel values with reference values, measurements of geometric or photometric parameters of the anomalies detected.

The optical-computing method of analysis can advantageously comprise the determination by computer of the relative location of the stressed region on the container with respect to the geometric marker. Such step is used to know e.g. whether the stressed region belongs to a variably sensitive region of interest, e.g., to a region of interest for which a variably significant threshold of residual mechanical stress value will be provided to decide, e.g. to discard a container, and to classify the container in a class of lower quality. For example as well, the optical-computing method of analysis can comprises a computer step of classification of the stressed region which takes into account the relative location of the stressed region on the container with respect to the geometrical marker, determined by computer, and a quantity representative of a polarization phase shift $\varphi(n)$, induced by a residual mechanical stress in the stressed region, in the emergent light coming from the stressed region, computed from the values of the partial pixels corresponding to the stressed region.

Typically, the optical-computing analysis process can be designed to detect, in the master image or the intensity image or the phase shift image, candidate pixels or candidate regions the values of which are outside a given interval or different from the values of the neighboring pixels or regions. For example, for each of the candidate pixels or candidate regions, the values of the intensity pixels and the values of the corresponding phase shift pixels can then be computed, in particular according to one or other of the variants of embodiments described hereinabove. On such basis, the method may be designed to classify, by computing, each of the candidate pixels or candidate regions as a defect or as a non-defect and/or classify same, by computing, into defects of different types, e.g. among at least one elliptical bubble ("bouillon"), or an inclusion. The classification by computer will advantageously be carried out on the basis of the values of intensity pixels, of phase shift and of relative location with respect to the geometric marker, hence depending on the belonging to specific regions of the container and taking into account variations in the relative position of the container with respect to the camera.

Moreover, in addition to the detection and/or measurement of the polarization phase shift induced by any residual mechanical stresses, the optical-computing method of analysis may include the step of determining by computing, in the intensity image, optical particularities of absorption or refraction of the container to detect defects in the container which may or may not generate residual mechanical stresses.

The invention claimed is:

1. An optical-computing method for analyzing, via transmitted light, a container made of transparent or translucent material having a rear and a front, using a polarimetric camera, the polarimetric camera including a two-dimensional photoelectric sensor comprising photoelectric elements each comprising a photoelectric cell, wherein each of the photoelectric cells is arranged in front of a polarization analysis system comprising at least one individual polarization analyzer associated with the photoelectric cell of the photoelectric element, the photoelectric sensor comprising N distinct groups of contiguous photoelectric elements; each distinct group of contiguous photoelectric elements comprising K photoelectric elements, wherein K is greater than or equal to two, and wherein the photoelectric elements belong to F distinct families of photoelectric elements, wherein F is greater than or equal to two;

wherein each family of photoelectric elements is defined by a polarization analysis characteristic of the polarization analysis system common to each of the photoelectric elements thereof, the polarization analysis characteristics of at least two families comprising at least two linear analyses along two orthogonal axes of polarization or at least two circular analyses in opposite directions to each other, each distinct group of photoelectric elements comprising at least two photoelectric elements belonging to at least two distinct families, and each distinct group of contiguous photoelectric elements corresponding to a composite pixel in a master image delivered by the photoelectric sensor;

the optical computing method comprises:

illuminating the container from the rear by an illumination device having at least two dimensions delivering, onto the container, incident light that is polarized either circularly with a first direction of rotation, or linearly along an incidence axis of polarization;

observing the container, from the front, by the polarimetric camera, so as to collect, on the photoelectric sensor of the polarimetric camera, an emerging light emitting from a point of the container;

acquiring, with the photoelectric sensor of the polarimetric camera, at least one digital master image of the container, having K*N master pixels corresponding to N distinct groups of contiguous photoelectric elements, the master image comprising N composite pixels, each composite pixel corresponding to one of the groups of contiguous photoelectric elements, and the master image comprising K distinct partial images each having N partial pixels, of which each partial pixel has a value proportional to the intensity of the emerging light emitted by the point of the container, the partial pixels of each partial image corresponding, for a given partial image, to only one family of photoelectric elements of the photoelectric sensor taken from the N composite pixels;

computing an intensity image, comprising at least one intensity pixel each having a value, wherein the value of each intensity pixel is an averaged value of the value of at least two partial pixels corresponding to two photoelectric elements of the same group but belonging to two distinct families of photoelectric elements the polarization analysis characteristics of which are two circular analyses of opposite directions to each other or two linear analyses of orthogonal axes of polarization or two orthogonal elliptical analyses;

computing at least one phase shift image each having at least one phase shift pixel by calculating, for a series of composite pixels, a phase shift pixel value which is representative of a polarization phase shift, induced by a residual mechanical stress in an elementary zone of the container, the elementary zone being a location on the container corresponding to the composite pixel, in the light emerging from the elementary zone of the container corresponding to the composite pixel, from the value of at least one partial pixel all extracted from the composite pixel and belonging to a combination of at least one partial image(s), wherein the value of each phase shift pixel of a phase shift image is calculated from the same combination of the at least one partial image(s).

2. The optical-computing method according to claim 1, wherein:

the photoelectric sensor comprises at least two distinct families of photoelectric elements the polarization analysis characteristics of which are two linear analyses along a first axis of polarization and a second axis of polarization orthogonal to the first axis of polarization, respectively;

the incident light is linearly polarized along the second axis of polarization;

the value of each phase shift pixel for a phase shift image is calculated from a value of at least one partial pixel corresponding to the first axis of polarization; and/or the value of each intensity pixel of the intensity image is an averaged value of a value of two partial pixels extracted from the same composite pixel and each associated with one of the two families, the axes of polarization of which are orthogonal and/or two partial pixels each associated with one of the two distinct families of photoelectric elements, the polarization analysis characteristics of which are two circular analyses of opposite directions to each other.

3. The optical-computing method according to claim 1, wherein:

the photoelectric sensor comprises at least four distinct families of photoelectric elements, the polarization analysis characteristics of which comprise at least four linear analyses along axes of polarization comprising two pairs of orthogonal axes of polarization, the two pairs of axes of polarization being offset from each other by an angle of 45 degrees;

the incident light is circularly polarized along one direction of incidence;

the value of each phase shift pixel for a phase shift image is calculated from values of four partial pixels extracted from the same composite pixel and each associated with at least one of the four distinct families of photoelectric elements, the polarization analysis characteristics of which are said linear analyses; and/or the value of each intensity pixel of the intensity image is an averaged value of at least two partial pixels extracted from the same composite pixel and each associated with two distinct families of photoelectric elements, the polarization analysis characteristics of which are two linear analyses of orthogonal axes of polarization.

4. The optical-computing method according to claim 1, wherein:

the incident light is circularly polarized along one direction of incidence;

the photoelectric sensor comprises at least one family of photoelectric elements, the polarization analysis characteristic of which is a circular analysis in the opposite direction to the direction of incidence;

the value of each phase shift pixel for a phase shift image is calculated from at least a value of the partial pixel associated with the family, the circular analysis of which has the opposite direction to the direction of incidence;

the value of each intensity pixel of the intensity image is an averaged value of two partial pixels extracted from the same composite pixel and each associated with one of two families, the circular analyses of which are in opposite directions to each other and/or two partial pixels each associated to one of the two distinct families of photoelectric elements, the polarization analysis characteristics of which are two linear analyses of orthogonal axes of polarization or two orthogonal elliptical analyses.

5. The optical-computing method according to claim 1, wherein:

the photoelectric sensor comprises at least two distinct families of photoelectric elements, the polarization analysis characteristics of which are two circular analyses of opposite directions to each other;

the incident light is circularly polarized;

the value of each phase shift pixel for a phase shift image is calculated from a value of two partial pixels extracted from the same composite pixel and each corresponding to one of the two circular analyses of opposite directions; and/or the value of each intensity pixel of the intensity image is an averaged value of two partial pixels extracted from the same composite pixel and each associated with one of the two families, the circular analyses of which are inverse to each other and/or two partial pixels extracted from the same composite pixel and each associated with one of the two distinct families of photoelectric elements, the polarization analysis characteristics of which are two linear analyses of orthogonal axes of polarization or two orthogonal elliptical analyses.

6. The optical-computing method according to claim 1, wherein the phase shift pixel value is a proportional bijective function of a polarization phase shift for phase shift values ranging from an angle of 0 degrees to an angle of 180 degrees.

7. The optical-computing method of analysis according to claim 1, wherein the method further comprises computing an intensity image wherein each intensity pixel is an averaged value of a value of a plurality of distinct pairs of partial pixels belonging to the same composite pixel, each distinct pair of partial pixels corresponding to a distinct pair of polarization analysis characteristics, each distinct pair of polarization analysis characteristics being chosen from one or more pairs of two circular analyses of opposite directions to each other, one or more pairs of two linear analyses of orthogonal axes of polarization, and/or one or more pairs of two elliptical analyses orthogonal to each other.

8. The optical-computing method according to claim 1, wherein the incident light has an energy spectrum comprised between 250 nm and 1000 nm and a width of less than 150 nm.

9. The optical-computing method according to claim 1, wherein each distinct group of contiguous photoelectric elements comprises four photoelectric elements belonging to one of four distinct families of photoelectric elements, wherein the polarization analysis characteristics of the four families comprising four linear analysis families along axes of polarization comprising two pairs of orthogonal axes of polarization, wherein the two pairs being offset from each other by an angle of 45 degrees, and wherein each distinct group of photoelectric elements comprises at least one photoelectric element belonging to each of the four distinct families.

10. The optical-computing method according to claim 1, wherein the illumination device comprises a light source having one or more dimensions perpendicular to an axis of incidence from the light source to the container larger than corresponding dimensions of a part of the container to be analyzed.

11. The optical-computing method according to claim 1, wherein optical absorption or refraction particularities are determined by computing in the intensity image, in order to detect defects of the container.

12. The optical-computing method according to claim 1, wherein a candidate pixel or candidate region is classified by computing as a defect or a non-defect and/or classified by computing as defects of different types among at least one elliptical bubble, or one inclusion, from values of intensity pixels, polarization phase shift values and from a location with respect to a geometric marker; and values of candidate pixels or candidate regions which are outside a given interval, or different from values of neighboring pixels or regions, are detected by computing in the master image or the intensity image or the phase shift image, and corresponding intensity pixel values and polarization phase shift pixel values are computed for each of the candidate pixels or candidate regions.

13. The optical-computing method according to claim 1, wherein the method further comprises:

using computer recognition of a known geometric marker of the container in the intensity image to determine a location thereof in the intensity image, wherein a localization link is established between the associated partial pixels, the intensity pixel, the phase shift pixel and the composite pixel;

using the localization link determining by computing of at least one region of interest in the phase shift image as a function of the location of the geometric marker; and/or identifying by computing of a location of a stressed region in the region of interest of the phase shift image.

14. The optical-computing method according to claim 13, wherein the identification by computing of the location of the stressed region uses the value of each phase shift pixel and the location thereof with respect to the geometric marker.

15. The optical-computing method according to claim 13, wherein the method further comprises determining by computing the location of the stressed region on the container with respect to the geometric marker.

16. The optical-computing method according to claim 13, wherein the method further comprises classifying, by a computer, the stressed region by using (i) the location of the stressed region on the container with respect to the geometrical marker as determined by the computer, and (ii) a quantity representative of the polarization phase shift, induced by the residual mechanical stress in the stressed region, of the emerging light emitting from the stressed region, wherein the quantity is computed from one or more values of the partial pixels corresponding to the stressed region.

17. A device for the analysis, via transmitted light, of defects in transparent or translucent material, the device comprising:

an illumination device configured to deliver, onto a container placed at an analysis location of the device, circularly polarized incident light at an incidence direction of rotation;

a polarimetric camera comprising, a two-dimensional photoelectric sensor comprising photoelectric elements each comprising a photoelectric cell, wherein each of the photoelectric cells is arranged in front of a polarization analysis system comprising at least one individual polarization analyzer associated with the photoelectric cell of the photoelectric element, the photoelectric sensor including N distinct groups of contiguous photoelectric elements, each distinct group of contiguous photoelectric elements comprising four photoelectric elements belonging to four distinct families of photoelectric elements, wherein each family of photoelectric elements being defined by an axis of polarization of the individual polarization analyzer that is common to each of the photoelectric elements thereof; wherein, for each of the four distinct families, the individual polarization analyzers associated with each of the four families are linear polarizing filters, the individual polarizing filters corresponding to at least one of the four distinct families each having a same axis of polarization, wherein the axes of polarization of the four families are distinct from each of the other families and the axes of polarization of the individual polarizing filters corresponding to the four families comprising two pairs of orthogonal axes of polarization and two pairs being offset from each other by an angle of 45 degrees along a direction;

each distinct group of photoelectric elements comprising a photoelectric element belonging to each distinct family, wherein the polarization analysis system includes a quarter-wave plate corresponding to the incident light, which is interposed between the analysis location and the individual polarizing filters, and a fast axis of the quarter-wave plate is arranged at an angle of 45 degrees from the axis of polarization of the individual polarizing filters of at least one of the four families such that the axes of polarization of the individual polarizing filters of the four families comprise two linear analyses along orthogonal directions and two circular analyses of opposite directions to each other.

18. The device according to claim 17, wherein the device includes a computer system programmed to:

acquire, with the photoelectric sensor of the polarimetric camera, at least one digital master image the container, having K*N of master pixels corresponding to N distinct groups of contiguous photoelectric elements, each distinct group of contiguous photoelectric elements comprising K photoelectric elements, wherein K is greater than or equal to 2 the master image comprising N composite pixels, each composite pixel corresponding to one of the distinct groups of contiguous photoelectric elements, and the master image comprising K distinct partial images each having N partial pixels, the partial pixels of each partial image corresponding, for a given partial image, to only one family of photoelectric elements of the sensor taken from the N composite pixels;

compute an intensity image comprising of at least one intensity pixel each having a value wherein the value of each intensity pixel is an averaged value of values of at least two partial pixels, wherein each partial pixel has a value proportional to an intensity of emerging light emitted by a point of the container, extracted from the same composite pixel and corresponding to two photoelectric elements of the same group but belonging to two distinct a families of photoelectric elements, polarization analysis characteristics of which are two circular analyses of opposite directions to each other or two linear analyses of orthogonal axes of polarization or two orthogonal elliptical analyses;

compute at least one phase shift image each having at least one phase shift pixel by computing, for a series of composite pixels, a phase shift pixel value which is representative of a polarization phase shift induced by residual mechanical stress in an elementary zone of the container corresponding to the composite pixel, in the light emerging from an elementary zone of the container, the elementary zone being a location on the container corresponding to the composite pixel, from a value of at least one partial pixel(s) all extracted from the composite pixel and belonging to a combination of at least one partial image(s), wherein the value of each phase shift pixel of a phase shift image is calculated from the same combination of the at least one partial image(s).

* * * * *